(12) United States Patent
Shibata et al.

(10) Patent No.: US 12,083,957 B2
(45) Date of Patent: Sep. 10, 2024

(54) VEHICLE DISPLAY SYSTEM AND VEHICLE

(71) Applicant: KOITO MANUFACTURING CO., LTD., Tokyo (JP)

(72) Inventors: Yoshinori Shibata, Shizuoka (JP); Toshihiko Kurebayashi, Shizuoka (JP); Masaaki Nakabayashi, Shizuoka (JP); Norihisa Sutou, Shizuoka (JP); Yoshiaki Fushimi, Shizuoka (JP); Atsushi Sugimoto, Shizuoka (JP); Naoki Takii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 709 days.

(21) Appl. No.: 17/266,820

(22) PCT Filed: Aug. 2, 2019

(86) PCT No.: PCT/JP2019/030570
§ 371 (c)(1),
(2) Date: Feb. 8, 2021

(87) PCT Pub. No.: WO2020/031912
PCT Pub. Date: Feb. 13, 2020

(65) Prior Publication Data
US 2021/0347259 A1    Nov. 11, 2021

(30) Foreign Application Priority Data

Aug. 6, 2018 (JP) ................. 2018-147733
Aug. 6, 2018 (JP) ................. 2018-147736
Aug. 15, 2018 (JP) ................. 2018-152901

(51) Int. Cl.
*B60Q 9/00* (2006.01)
*B60K 35/00* (2024.01)
(Continued)

(52) U.S. Cl.
CPC ................. *B60Q 9/00* (2013.01); *B60K 35/00* (2013.01); *B60Q 1/04* (2013.01); *B60Q 1/507* (2022.05);
(Continued)

(58) Field of Classification Search
CPC ........ B60Q 9/00; B60Q 1/04; B60Q 2400/50; B60K 35/00; B60K 2370/1529;
(Continued)

(56) References Cited

U.S. PATENT DOCUMENTS

2016/0090023 A1* 3/2016 Asaoka ................... B60Q 1/06
345/697
2016/0179094 A1 6/2016 Sorokin et al.
(Continued)

FOREIGN PATENT DOCUMENTS

DE    102012023630 A1    6/2014
DE    102014226188 A1    6/2016
(Continued)

OTHER PUBLICATIONS

Extended European Search Report issued in European Application No. 19847682.2, mailed Aug. 10, 2021 (8 pages).
(Continued)

*Primary Examiner* — Ig T An
(74) *Attorney, Agent, or Firm* — Osha Bergman Watanabe & Burton LLP

(57) ABSTRACT

A vehicle display system, which is provided in a vehicle, includes a first display device configured to emit a light pattern toward a road surface outside the vehicle; and a second display device located inside the vehicle and configured to display predetermined information toward an occupant of the vehicle such that the predetermined information is superimposed on a real space outside the vehicle.

20 Claims, 20 Drawing Sheets

(51) Int. Cl.
*B60K 35/23* (2024.01)
*B60K 35/28* (2024.01)
*B60Q 1/04* (2006.01)
*B60Q 1/50* (2006.01)
*B60K 35/81* (2024.01)

(52) U.S. Cl.
CPC ............. *B60Q 1/543* (2022.05); *B60Q 1/547* (2022.05); *B60K 35/23* (2024.01); *B60K 35/28* (2024.01); *B60K 35/81* (2024.01); *B60K 2360/179* (2024.01); *B60K 2360/347* (2024.01); *B60Q 2300/45* (2013.01); *B60Q 2400/50* (2013.01)

(58) Field of Classification Search
CPC .......... B60K 2370/347; B60K 2370/52; G02B 27/0101; B60R 1/00
See application file for complete search history.

(56) References Cited

U.S. PATENT DOCUMENTS

| | | |
|---|---|---|
| 2017/0337821 A1 | 11/2017 | Masuda et al. |
| 2018/0093553 A1 | 4/2018 | Sorokin et al. |
| 2018/0334108 A1* | 11/2018 | Rotzer et al. ........... B60R 11/04 |
| 2019/0051185 A1 | 2/2019 | Masuda et al. |
| 2019/0082123 A1* | 3/2019 | Yamada ................. H04N 7/183 |
| 2019/0163186 A1* | 5/2019 | Yoon ...................... B60K 35/00 |
| 2019/0225057 A1 | 7/2019 | Sorokin et al. |

FOREIGN PATENT DOCUMENTS

| | | | |
|---|---|---|---|
| EP | 2085688 A2 | 8/2009 | |
| EP | 3192698 A1 | 7/2017 | |
| JP | H09-277887 A | 10/1997 | |
| JP | 2016-055691 A | 4/2016 | |
| JP | 2016-088187 A | 5/2016 | |
| JP | 2018-014616 A | 1/2018 | |
| WO | 2015-144751 A1 | 10/2015 | |
| WO | WO-2016039288 A1 * | 3/2016 | ............... B60Q 1/00 |

OTHER PUBLICATIONS

International Search Report issued in International Application No. PCT/JP2019/030570, mailed Oct. 21, 2019 (5 pages).

Written Opinion issued in International Application No. PCT/JP2019/030570, mailed Oct. 21, 2019 (5 pages).

* cited by examiner

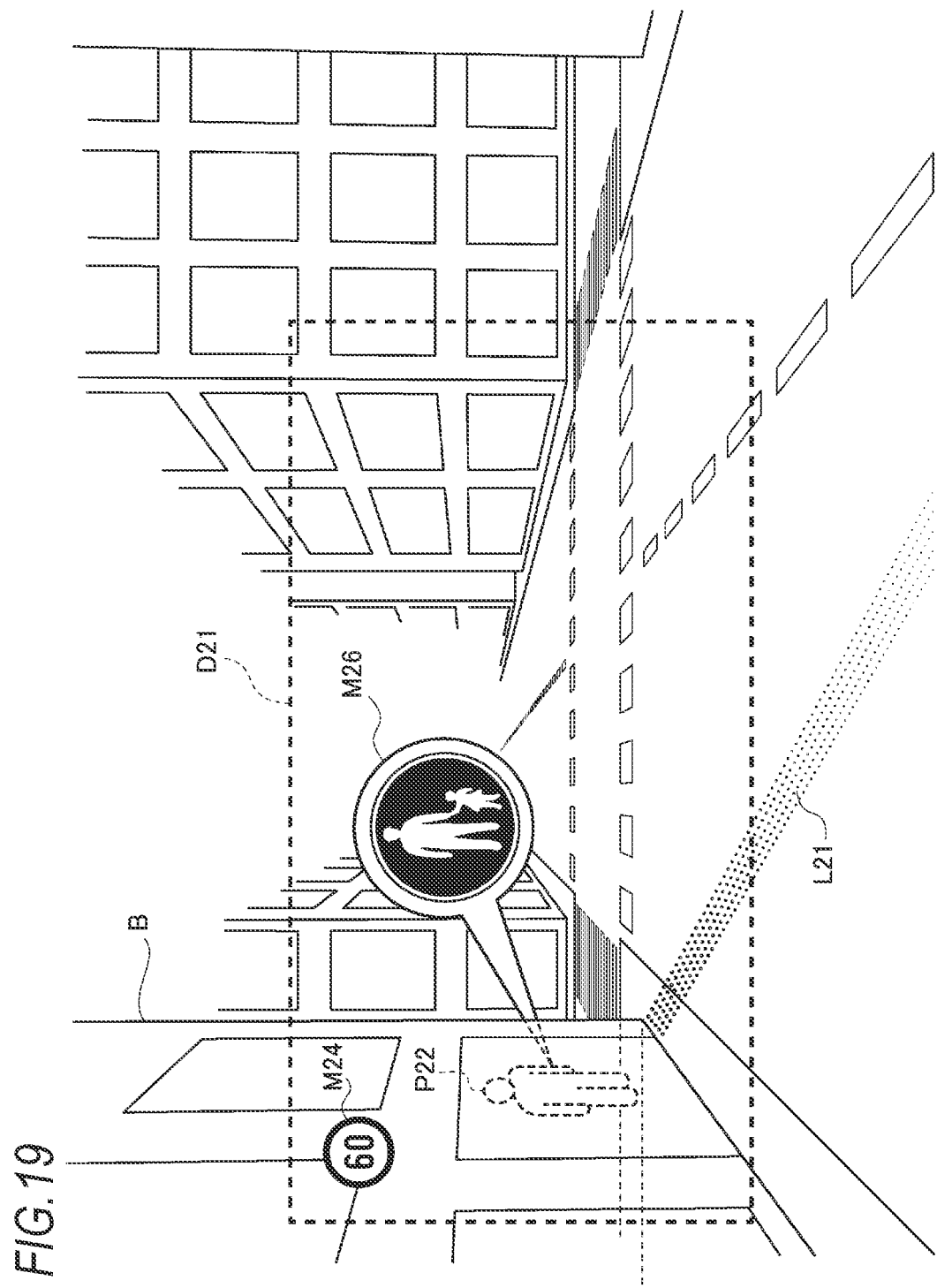

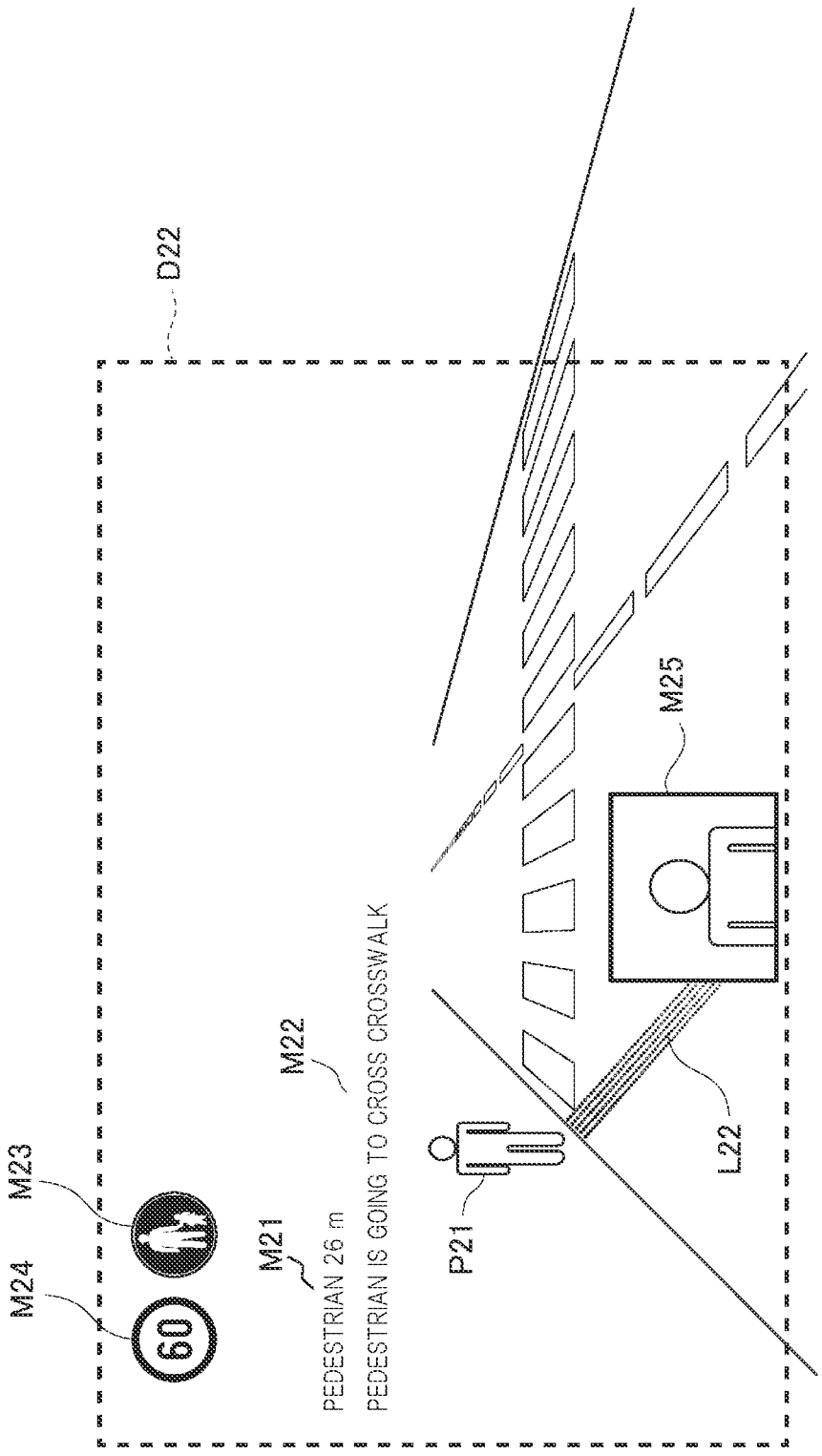

VEHICLE DISPLAY SYSTEM AND VEHICLE

TECHNICAL FIELD

The present disclosure relates to a vehicle display system and a vehicle including the vehicle display system.

BACKGROUND ART

Currently, research on an automated driving technology for an automobile is actively carried out in each country, and legislation for allowing a vehicle (Hereinafter, the "vehicle" refers to the automobile.) to travel on a public road in an automated driving mode is being studied in each country. Here, in the automated driving mode, a vehicle system automatically controls traveling of the vehicle. Specifically, in the automated driving mode, the vehicle system automatically performs at least one of steering control (control of a traveling direction of the vehicle), brake control and accelerator control (control of vehicle braking and acceleration/deceleration) according to information (surrounding environment information) indicating a surrounding environment of the vehicle obtained from a sensor such as a camera or a radar (for example, a laser radar or a millimeter wave radar). In contrast, in a manual driving mode described below, a driver controls the traveling of the vehicle, as is a case with many related-art vehicles. Specifically, in the manual driving mode, the traveling of the vehicle is controlled according to an operation of the driver (a steering operation, a brake operation and an accelerator operation), and the vehicle system does not automatically perform the steering control, the brake control and the accelerator control. A driving mode of the vehicle is not a concept existing only in some vehicles, but a concept existing in all vehicles including the related-art vehicles not having an automated driving function, and is classified according to, for example, a vehicle control method.

Therefore, the vehicle traveling in the automated driving mode (hereinafter, appropriately referred to as an "automated driving vehicle") and the vehicle traveling in the manual driving mode (hereinafter, appropriately referred to as a "manual driving vehicle") are expected to coexist on the public road in the future.

As an example of the automated driving technology, Patent Literature 1 discloses an automated following traveling system in which a following vehicle automatically follows a preceding vehicle. In the automated following traveling system, each of the preceding vehicle and the following vehicle includes a lighting system, and character information for preventing other vehicles from interrupting between the preceding vehicle and the following vehicle is displayed on the lighting system of the preceding vehicle, and character information indicating that the following vehicle automatically follows the preceding vehicle is displayed on the lighting system of the following vehicle.

Patent Literature 1: JP H9-277887 A

SUMMARY OF INVENTION

In a future automated driving society, it is expected that visual communication between the automated driving vehicle and a person will become important. In particular, it is expected that visual communication between a vehicle and an object such as a pedestrian present outside the vehicle, and visual communication between the vehicle and an occupant of the vehicle become increasingly important. In this respect, it is possible to realize the visual communication between the vehicle and the object using a road surface drawing device that emits a light pattern onto a road surface, and it is possible to realize the visual communication between the vehicle and the occupant using a head-up display (HUD).

A first object of the present disclosure is to provide a vehicle display system and a vehicle capable of realizing rich visual communication between a vehicle and an object and rich visual communication between the vehicle and an occupant.

A second object of the present disclosure is to provide a vehicle display system and a vehicle capable of improving visibility of an occupant to a light pattern emitted onto a road surface and information visually presented toward the occupant.

A third object of the present disclosure is to provide a vehicle display system, a vehicle system and a vehicle that allow an occupant to clearly view an object present outside the vehicle.

A vehicle display system according to an aspect of the present disclosure provided in a vehicle includes: a first display device configured to emit a light pattern toward a road surface outside the vehicle; and a second display device located inside the vehicle and configured to display predetermined information toward an occupant of the vehicle such that the predetermined information is superimposed on a real space outside the vehicle.

According to the above configuration, rich visual communication between the vehicle and an object can be realized by the light pattern emitted from the first display device, and rich visual communication between the vehicle and the occupant can be realized by the predetermined information displayed by the second display device.

Information indicated by the light pattern and the predetermined information may be associated with each other According to the above configuration, the occupant can clearly grasp an intention of the vehicle presented to the object by viewing the predetermined information.

The light pattern and the predetermined information may indicate information on traveling of the vehicle.

According to the above configuration, the object can clearly grasp an intention of the vehicle by viewing the light pattern emitted from the first display device. Further, the occupant can clearly grasp the intention of the vehicle by viewing the predetermined information displayed by the second display device.

The light pattern may indicate information on traveling of the vehicle, while the predetermined information may indicate information on an object present around the vehicle.

According to the above configuration, the object can clearly grasp an intention of the vehicle by viewing the light pattern emitted from the first display device. On the other hand, the occupant can clearly grasp presence of the object and the information on the object by viewing the predetermined information displayed by the second display device.

The predetermined information may be displayed so as to overlap the light pattern when viewed from the occupant. A display color of the predetermined information may be different from a display color of the light pattern.

According to the above configuration, the occupant can more clearly view the predetermined information displayed by the second display device.

The second display device may be configured to display a shielding pattern having a display color the same as a background color of the real space so as to overlap the light pattern when viewed from the occupant.

According to the above configuration, the occupant can be prevented from viewing the light pattern by the shielding pattern having the display color the same as the background color of the real space. In this way, it is possible to prevent a misunderstanding from occurring in the communication between the occupant and the vehicle due to the light pattern presented to the object.

The second display device may include a transmittance adjustment unit disposed so as to face a display area where the predetermined information is displayed.

According to the above configuration, the occupant and be prevented from viewing the light pattern by the transmittance adjustment unit. In this way, it is possible to prevent a misunderstanding from occurring in the communication between the occupant and the vehicle due to the light pattern presented to the object.

A vehicle display system according to another aspect of the present disclosure provided in a vehicle includes: a first display device configured to emit a light pattern toward a road surface outside the vehicle; and a second display device located inside the vehicle and configured to display predetermined information toward an occupant of the vehicle such that the predetermined information is superimposed on a real space outside the vehicle.

In a field of view of the occupant, a first area where the predetermined information can be displayed is set such that the first area is located above a second area where the light pattern emitted onto the road surface can be present.

According to the above configuration, since the first area is set such that the first area is located above the second area in the field of view of the occupant, the predetermined information and the light pattern can be viewed by the occupant in a state of being clearly distinguished from each other. In this way, visibility of the occupant to the light pattern emitted onto the road surface and the predetermined information can be improved.

The first area may be located above the second area so as not to overlap the second area.

According to the above configuration, since the first area is set such that the first area does not overlap the second area and the first area is located above the second area, the predetermined information and the light pattern can be viewed by the occupant in a state of being clearly distinguished from each other. In this way, visibility of the occupant to the light pattern emitted onto the road surface and the predetermined information can be improved.

The second area may include a road surface within a first distance from a front end of the vehicle, while the first area may include a road surface exceeding the first distance from the front end of the vehicle.

The first area may be located above the second area so as to partially overlap the second area.

According to the above configuration, since the first area is set such that the first area partially overlaps the second area and the first area is located above the second area, the predetermined information and the light pattern can be viewed by the occupant in a state of being distinguished from each other. In this way, visibility of the occupant to the light pattern emitted onto the road surface and the predetermined information can be improved, and the light pattern and the predetermined information can be visually associated with each other.

The second area may include a road surface within a first distance from a from end of the vehicle, while the first area may include a road surface exceeding a second distance from the front end of the vehicle. The second distance may be smaller than the first distance.

The light pattern may be emitted onto the road surface toward an object present around the vehicle. The predetermined information may indicate information on the object.

According to the above configuration, the occupant can clearly grasp the presence of the object by looking at the light pattern, and can clearly grasp the information on the object by looking at the predetermined information. In this way, the occupant can simultaneously grasp the presence of the object and the information on the object.

A vehicle display system according to another aspect of the present disclosure provided in a vehicle includes: a first display device configured to emit a light pattern toward a road surface outside the vehicle; and a second display device located inside the vehicle and configured to display predetermined information toward an occupant of the vehicle such that the predetermined information is superimposed on a real space outside the vehicle.

The first display device emits the light pattern toward an object, and the second display device displays information on the object toward the occupant.

According to the above configuration, the first display device emits the light pattern toward the object (for example, a pedestrian), and the second display device displays the information on the object. Therefore, the occupant can grasp a position of the object by looking at the light pattern emitted from the first display device, and can grasp the information on the object through the second display device. In this way, since the position of the object and the information on the object are visually presented to the occupant using two different display devices that are the first display device and the second display device, the occupant can clearly view the object.

When the object is present within a predetermined distance from the vehicle, the first display device may emit the light pattern toward the object, and the second display device may display the information on the object toward the occupant.

According to the above configuration, the occupant can clearly view the object present within the predetermined distance from the vehicle.

The information on the object may include information indicating presence of the object.

According to the above configuration, since the position of the object and the presence of the object are visually presented to the occupant using two different display devices that are the first display device and the second display device, the occupant can clearly view the object.

The information on the object may include an enlarged image of the object.

According to the above configuration, since the position of the object and the enlarged image of the object are visually presented to the occupant using two different display devices that are the first display device and the second display device, the occupant can clearly view the object.

The information on the object may include information on a future behavior of the object.

According to the above configuration, the position of the object and the information on the future behavior of the object are visually presented to the occupant using two different display devices that are the first display device and the second display device. Therefore, the occupant can clearly view the object, and can perform appropriate traveling control on the vehicle in consideration of the future behavior of the object.

A vehicle system including the vehicle display system and a wireless communication unit configured to receive the information indicating the presence of the object from an external communication device present outside the vehicle may be provided.

According to the above configuration, the information indicating the presence of the object can be received from the external communication device. Therefore, even if a sensor such as a camera mounted on the vehicle or the occupant cannot detect the object (that is, even if the object is present in a place invisible to the vehicle), the occupant can clearly grasp the presence of the object through the first display device and the second display device.

According to the present disclosure, it is possible to provide a vehicle display system and a vehicle capable of realizing rich visual communication between a vehicle and an object and rich visual communication between the vehicle and an occupant.

In addition, according to the present disclosure, it is possible to provide a vehicle display system and a vehicle capable of improving visibility of an occupant to a light pattern emitted onto a road surface and information visually presented toward the occupant.

Further, according to the present disclosure, it is possible to provide a vehicle display system, a vehicle system and a vehicle that allow an occupant to clearly view an object present outside the vehicle.

BRIEF DESCRIPTION OF DRAWINGS

FIG. 19 is a view showing an example of HUD information indicating presence of the pedestrian invisible to the occupant.

FIG. 20 is a view showing an example of a light pattern that visually associates the enlarged image of the pedestrian with the pedestrian.

DESCRIPTION OF EMBODIMENTS

Figure 1:
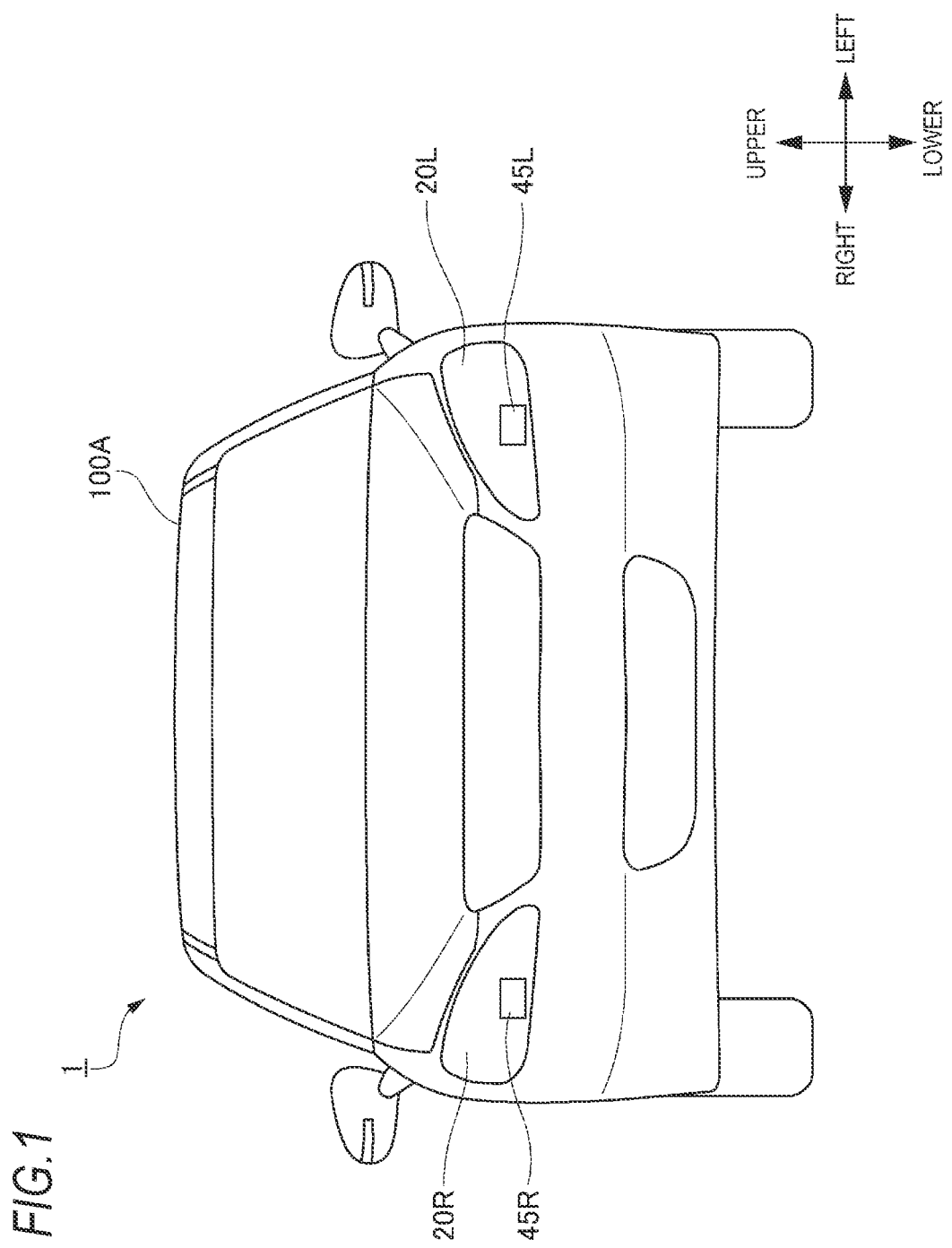
FIG. 1 is a front view of a vehicle equipped with a vehicle system according to embodiments of the present invention (hereinafter, simply referred to as the present embodiment).

Hereinafter, embodiments of the present invention (hereinafter, referred to as the present embodiment) will be described with reference to the drawings. Dimensions of members shown in the drawings may be different from actual dimensions of the members for convenience of description.

In description of the present embodiment, a "left-right direction", an "upper-lower direction" and a "front-rear direction" may be appropriately referred to, for convenience of description. These directions are relative directions set for a vehicle 1 shown in FIG. 1. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIG. 1, the front-rear direction is the direction orthogonal to the left-right direction and the upper-lower direction.

Figure 2:
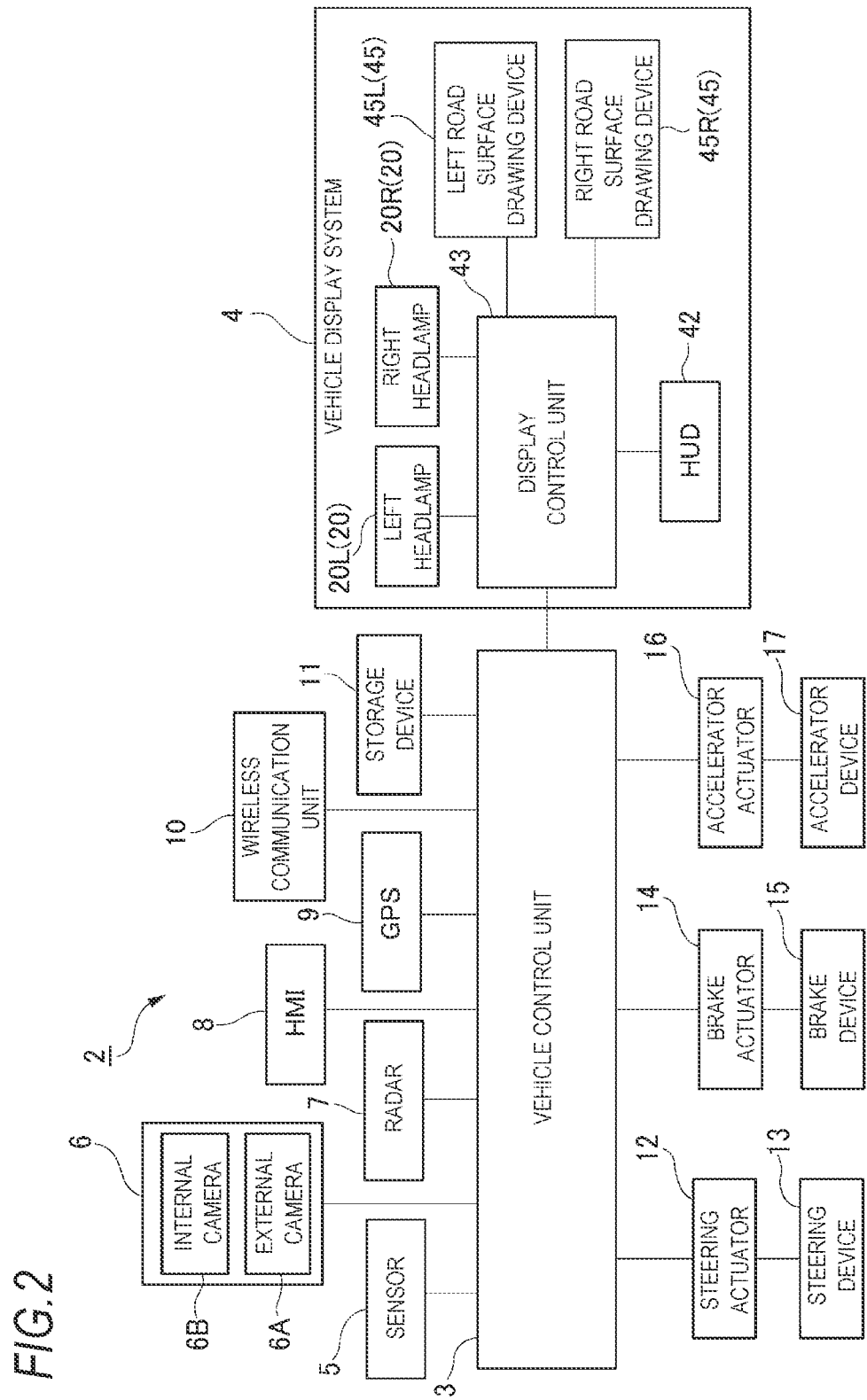
FIG. 2 is a block diagram of the vehicle system according to the present embodiment.

First, a vehicle system 2 according to the present embodiment will be described with reference to FIGS. 1 and 2. FIG. 1 is a front view of the vehicle 1 equipped with the vehicle system 2. FIG. 2 is a block diagram of the vehicle system 2. The vehicle 1 is a vehicle (an automobile) capable of traveling in an automated driving mode.

As shown in FIG. 2, the vehicle system 2 includes a vehicle control unit 3, a vehicle display system 4 (hereinafter, simply referred to as a "display system 4"), a sensor 5, a camera 6 and a radar 7. The vehicle system 2 further includes a human machine interface (HMI) 8, a global positioning system (GPS) 9, a wireless communication unit 10, a storage device 11, a steering actuator 12, a steering device 13, a brake actuator 14, a brake device 15, an accelerator actuator 16 and an accelerator device 17.

The vehicle control unit 3 is configured to control traveling of the vehicle 1. The vehicle control unit 3, for example, includes at least one electronic control unit (ECU). The electronic control unit includes a computer system (for example, a system on a chip (SoC)) including one or more processors and one or more memories, and an electronic circuit including an active element such as a transistor and a passive element. The processor includes, for example, at least one of a central processing unit (CPU), a micro processing unit (MPU), a graphics processing unit (GPU) and a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is a program (a trained model) constructed by supervised or unsupervised machine learning (particularly, deep learning) using a multilayer neural network. The RAM may temporarily store a vehicle control program, vehicle control data and/or surrounding environment information indicating a surrounding environment of the vehicle. The processor may be configured to develop a program designated from various vehicle control programs stored in the ROM on the RAM and execute various types of processing in cooperation with the RAM. The computer system may include a non-Neumann type computer such as an application specific integrated circuit (ASIC) or a field-programmable gate array (FPGA). Further, the computer system may include a combination of a Neumann type computer and a non-Neumann type computer.

The display system 4 includes a left headlamp 20L, a right headlamp 20R, a left road surface drawing device 45L and a right road surface drawing device 45R. The display system 4 further includes a head-up display (HUD) 42 and a display control unit 43.

As shown in FIG. 1, the left headlamp 20L is disposed on a left front surface of the vehicle 1, and includes a low beam lamp configured to irradiate ahead of the vehicle 1 with a low beam, and a high beam lamp configured to irradiate ahead of the vehicle 1 with a high beam. The right headlamp 20R is disposed on a right front surface of the vehicle 1, and includes a low beam lamp configured to irradiate ahead of the vehicle 1 with a low beam, and a high beam lamp configured to irradiate ahead of the vehicle 1 with a high beam. Each of the low beam lamp and the high beam lamp includes one or more light emitting elements such as light emitting diodes (LED) or laser diodes (LD), and an optical member such as a lens and a reflector. Hereinafter, the left head lamp 20L and the right headlamp 20R may be collectively referred to simply as the headlamp 20 for convenience of description.

The left road surface drawing device 45L (an example of a first display device) is disposed in a lamp chamber of the left headlamp 20L. The left road surface drawing device 45L is configured to emit a light pattern toward a road surface outside the vehicle 1. The left road surface drawing device 45L includes, for example, a light source unit, a drive mirror, an optical system such as a lens and a mirror, a light source drive circuit, and a mirror drive circuit. The light source unit is a laser light source or an LED light source. For example, the laser light source is RGB laser light sources configured to respectively emit red laser light, green laser light and blue laser light. The drive mirror is, for example, a micro electro mechanical systems (MEMS) mirror, a digital mirror device (DMD), a galvanometer mirror, a polygon mirror or the like. The light source drive circuit is configured to control driving of the light source unit. The light source drive circuit is configured to generate a control signal for controlling an operation of the light source unit based on a signal related to a predetermined light pattern transmitted from the display control unit 43, and then transmit the generated control signal to the light source unit. The mirror drive circuit is configured to control driving of the drive mirror. The mirror drive circuit is configured to generate a control signal for controlling an operation of the drive mirror based on a signal related to a predetermined light pattern transmitted from the display control unit 43. and then transmit the generated control signal to the drive mirror. When the light source unit is the RGB laser light sources, the left road surface drawing device 45L can draw light patterns of various colors on the road surface by performing scanning with laser light. For example, the light pattern may be an arrow-shaped light pattern indicating a traveling direction of the vehicle 1.

The right road surface drawing device 45R is disposed in a lamp chamber of the right headlamp 20R. The right road surface drawing device 45R is configured to emit a light pattern toward the road surface outside the vehicle 1. Similarly to the left road surface drawing device 45L, the right road surface drawing device 45R includes a light source unit, a drive mirror, an optical system such as a lens, a light source drive circuit, and a mirror drive circuit.

A drawing method of the left road surface drawing device 45L and the right road surface drawing device 45R may be a raster scan method, a digital light processing (DLP) method or a liquid crystal on silicon (LCOS) method. When the DLP method or the LCOS method is adopted, the light source unit may be the LED light source. A projection method may be adopted as a drawing method of the left road surface drawing device 45L and the right road surface drawing device 45R. When the projection method is adopted, the light source unit may be a plurality of LED light sources arranged in a matrix. In the present embodiment, the left road surface drawing device 45L and the right road surface drawing device 45R may be disposed on a vehicle body roof 100A. In this respect, one road surface drawing device may be disposed on the vehicle body roof 100A. Hereinafter, for convenience of description, the left road surface drawing device 45L and the right road surface drawing device 45R may be collectively referred to simply as the road surface drawing device 45. In the following description, the road surface drawing device 45 indicates the left road surface drawing device 45L, the right road surface drawing device 45R, or a combination of the left road surface drawing device 45L and the right road surface drawing device 45R.

Figure 3:
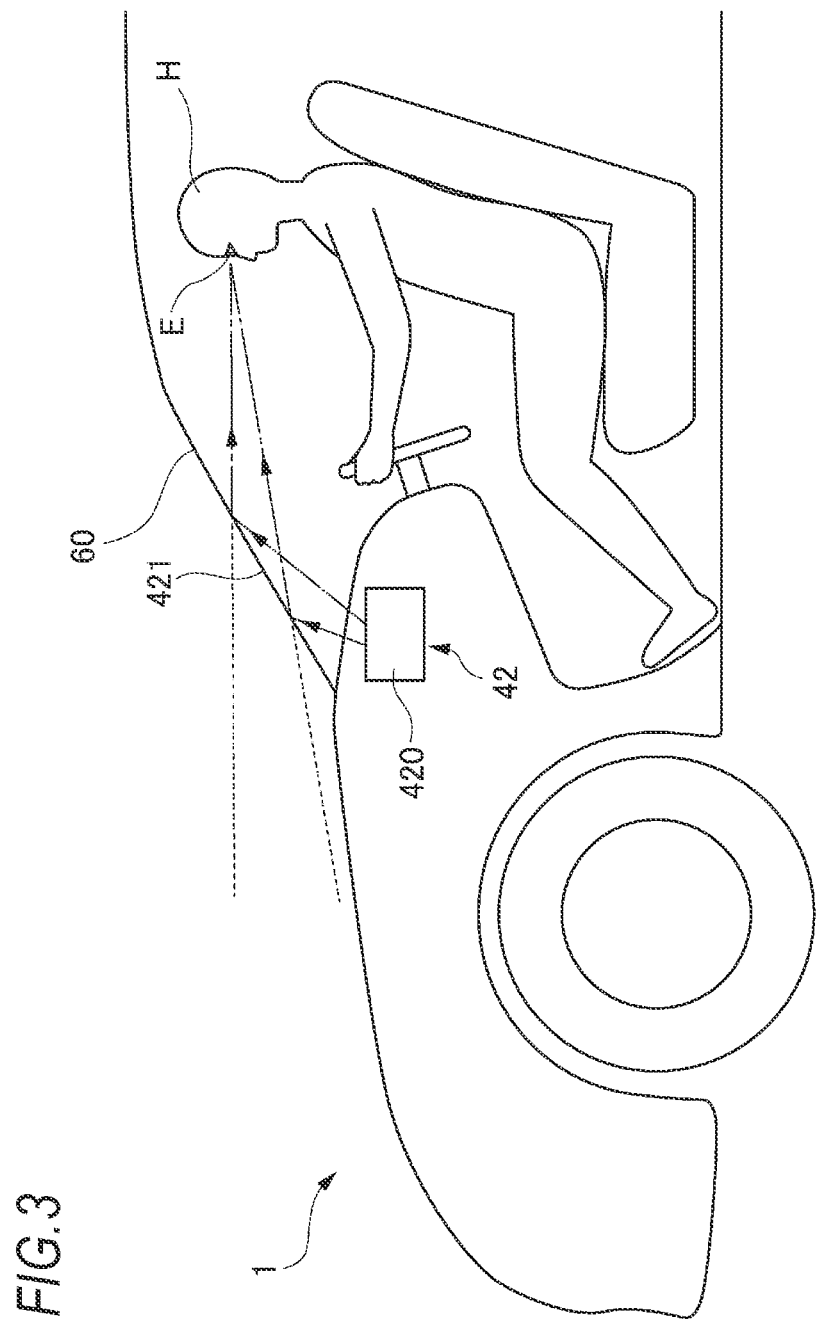
FIG. 3 is a view showing a state in which light emitted from a head-up display (HUD) reaches eyes of an occupant.

The HUD 42 (an example of a second display device) is located inside the vehicle 1 Specifically, the HUD 42 is installed at a predetermined position inside the vehicle 1. For example, as shown in FIG. 3, the HUD 42 may be disposed in a dashboard of the vehicle 1. The HUD 42 functions as a visual interface between the vehicle 1 and an occupant H. The HUD 42 is configured to display predetermined information (hereinafter, referred to as HUD information) toward the occupant H such that the HUD information is superimposed on a real space outside the vehicle 1 (particularly, the surrounding environment ahead of the vehicle 1). In this way, the HUD 42 functions as an augmented reality (AR) display. The HUD information displayed by the HUD 42 is, for example, vehicle traveling information on the traveling of the vehicle 1 and/or the surrounding environment information on the surrounding environment of the vehicle 1 (particularly, information related to an object present outside the vehicle 1).

As shown in FIG. 3, the HUD 42 includes a HUD main body 420 and a transparent screen 421. The HUD main body 420 includes a light source unit, a drive mirror, an optical system, a light source drive circuit and a mirror drive circuit. The light source unit is, for example, a laser light source or an LED light source. The laser light source is, for example, RGB laser light sources configured to respectively emit red laser light, green laser light and blue laser light. The drive mirror is, for example, a MEMS mirror, a DMD, a galvanometer mirror, a polygon mirror or the like. The optical system includes at least one of a prism, a lens, a diffusion plate, and a magnifying glass. The light source drive circuit is configured to control driving of the light source unit. The light source drive circuit is configured to generate a control signal for controlling an operation of the light source unit based on image data transmitted from the display control unit 43, and then transmit the generated control signal to the light source unit. The mirror drive circuit is configured to control driving of the drive mirror. The mirror drive circuit is configured to generate a control signal for controlling an operation of the drive mirror based on image data transmitted from the display control unit 43, and then transmit the generated control signal to the drive mirror.

The transparent screen 421 includes a part of a front window 60. The transparent screen 421 has a HUD display area D1 where the HUD information can be displayed (see FIG. 6). Light (an image) emitted from the HUD main body 420 is radiated to the HUD display area D1 of the transparent screen 421. Next, the HUD display area D1 reflects the light emitted from the HUD main body 420 toward a viewpoint E of the occupant H. As a result, the occupant H recognizes the light (the image) emitted from the HUD main body 420 as a virtual image formed at a predetermined position ahead of the transparent screen 421. In this way, as a result of the HUD information (the image) displayed by the HUD 42 being superimposed on the real space ahead of the vehicle 1, the occupant H can feel that the HUD information is floating on a road.

The transparent screen 421 may be configured as a transparent combiner separated from the front window 60. Even in this case, the combiner has the HUD display area. Further, the occupant H recognizes the light (the image) emitted from the HUD main body 420 as the virtual image formed at a predetermined position ahead of the combiner. The position where the virtual image is formed (a virtual image formation position) may be changed by adjusting a position of the optical system of the HUD 42 (particularly, a focal length of a projection optical system). In this respect, the display control unit 43 can control the HUD 42 such that a position of an object present ahead of the vehicle 1 and the virtual image formation position substantially coincide with each other based on position information of the object. A drawing method of the HUD 42 may be a raster scan method, a DLP method or an LCOS method. When the DLP method or the LCOS method is adopted, the light source unit of the HUD 42 may be an LED light source.

The display control unit 43 is configured to control operations of the road surface drawing device 45 (specifically, the left road surface drawing device 45L and the right road surface drawing device 45R), the headlamp 20 (specifically, the left headlamp 20L and the right headlamp 20R), and the HUD 42. In this respect, the display control unit 43 is configured to control the operation of the road surface drawing device 45 (specifically, the left road surface drawing device 45L and the right road surface drawing device 45R) such that the light pattern is radiated to a predetermined position on the road surface. The display control unit 43 is configured to control the operation of the HUD 42 such that the HUD information is displayed in the HUD display area D1.

The display control unit 43 includes an electronic control unit (ECU). The electronic control unit includes a computer system (for example, an SoC) including one or more processors and one or more memories, and an electronic circuit including an active element such as a transistor and a passive element. The processor includes at least one of a CPU, an MPU, a GPU and a TPU. The memory includes a ROM and a RAM. The computer system may include a non-Neumann type computer such as an ASIC or an FPGA.

In the present embodiment, the vehicle control unit 3 and the display control unit 43 are provided as separate components, but the vehicle control unit 3 and the display control unit 43 may be integrally configured. In this respect, the display control unit 43 and the vehicle control unit 3 may be formed of a single electronic control unit. The display control unit 43 may include two electronic control units: an electronic control unit configured to control the operations of the headlamp 20 and the road surface drawing device 45, and an electronic control unit configured to control the operation of the HUD 42.

The sensor 5 includes at least one of an acceleration sensor, a speed sensor and a gyro sensor. The sensor 5 is configured to detect a traveling state of the vehicle 1 and output traveling state information to the vehicle control unit 3. The sensor 5 may further include a seating sensor that detects whether a driver is seated in a driver seat, a face orientation sensor that detects a direction of a face of the driver, an external weather sensor that detects an external weather condition, a human sensor that detects whether there is a person in the vehicle, or the like.

The camera 6 is, for example, a camera including an imaging element such as a charge-coupled device (CCD) or a complementary MOS (CMOS). The camera 6 includes one or more external cameras 6A and an internal camera 6B. The external camera 6A is configured to acquire image data indicating the surrounding environment of the vehicle 1 and then transmit the image data to the vehicle control unit 3. The vehicle control unit 3 acquires the surrounding environment information based on the transmitted image data. Here, the surrounding environment information may include information on the object (a pedestrian, other vehicles, a sign or the like) present outside the vehicle 1. For example, the surrounding environment information may include information on attributes of the object present outside the vehicle 1 and information on a distance or a position of the object with respect to the vehicle 1. The external camera 6A may be configured as a monocular camera or a stereo camera.

The internal camera 6B is disposed inside the vehicle 1 and is configured to acquire image data indicating the occupant H. The internal camera 6B functions as a tracking camera for tracking the viewpoint E of the occupant H. Here, the viewpoint E of the occupant H may be either a viewpoint of a left eye or a viewpoint of a right eye of the occupant H. Alternatively, the viewpoint E may be defined as a middle point of a line segment connecting the viewpoint of the left eye and the viewpoint of the right eye. The display control unit 43 may specify a position of the viewpoint E of the occupant H based on the image data acquired by the internal camera 6B. The position of the viewpoint E of the occupant H may be updated at a predetermined cycle based on the image data, or may be determined only once when the vehicle 1 is started.

The radar 7 includes at least one of a millimeter wave radar, a microwave radar and a laser radar (for example, a LiDAR unit). For example, the LiDAR unit is configured to detect the surrounding environment of the vehicle 1. In particular, the LiDAR unit is configured to acquire 3D mapping data (point cloud data) indicating the surrounding environment of the vehicle 1 and then transmit the 3D mapping data to the vehicle control unit 3. The vehicle control unit 3 specifies the surrounding environment information based on the transmitted 3D mapping data.

The HMI 8 includes an input unit that receives an input operation from the driver, and an output unit that outputs the traveling information or the like to the driver. The input unit includes a steering wheel, an accelerator pedal, a brake pedal, a driving mode switching switch that switches a driving mode of the vehicle 1, and the like. The output unit is a display (excluding a HUD) that displays various types of travel information. The GPS 9 is configured to acquire current position information of the vehicle 1 and output the acquired current position information to the vehicle control unit 3.

The wireless communication unit 10 is configured to receive information on other vehicles around the vehicle 1 (for example, traveling information) from other vehicles and transmit information (for example, the traveling information) on the vehicle 1 to other vehicles (inter-vehicle communication). The wireless communication unit 10 is configured to receive infrastructure information from infrastructure equipment such as a traffic light or a sign lamp and transmit the traveling information on the vehicle 1 to the infrastructure equipment (road-vehicle communication). The wireless communication unit 10 is configured to receive information on a pedestrian from a portable electronic device (a smart phone, a tablet, a wearable device or the like) carried by the pedestrian and transmit the own vehicle traveling information on the vehicle 1 to the portable electronic device (pedestrian-vehicle communication). The vehicle 1 may directly communicate with other vehicles, the infrastructure equipment or the portable electronic device in an ad-hoc mode, or via an access point. The vehicle 1 may communicate with other vehicles, the infrastructure equipment or the portable electronic device via a communication network (not shown). The communication network includes at least one of the Internet, a local area network (LAN), a wide area network (WAN) and a radio access network (RAN). A wireless communication standard is, for example, Wi-Fi (registered trademark), Bluetooth (registered trademark), ZigBee (registered trademark), IPWA, DSRC (registered trademark) or Li-Fi. The vehicle 1 may communicate with other vehicles, the infrastructure equipment or the portable electronic device using a fifth generation mobile communication system (5G).

The storage device 11 is an external storage device such as a hard disk drive (HDD) or a solid state drive (SSD). The storage device 11 may store two-dimensional or three-dimensional map information and/or a vehicle control program. For example, the three-dimensional map information may include 3D mapping data (point cloud data). The storage device 11 is configured to output the map information and the vehicle control program to the vehicle control unit 3 in response to a request from the vehicle control unit 3. The map information and the vehicle control program may be updated via the wireless communication unit 10 and the communication network.

When the vehicle 1 travels in the automated driving mode, the vehicle control unit 3 automatically generates at least one of a steering control signal, an accelerator control signal and a brake control signal based on the traveling state information, the surrounding environment information, the current position information, the map information and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, the vehicle control unit 3 automatically controls the traveling of the vehicle 1 based on the traveling state information, the surrounding environment information, the current position information, the map information and the like. That is, in the automated driving mode, the traveling of the vehicle 1 is automatically controlled by the vehicle system 2.

On the other hand, when the vehicle 1 travels in a manual driving mode, the vehicle control unit 3 generates the steering control signal, the accelerator control signal and the brake control signal according to a manual operation of the driver on the accelerator pedal, the brake pedal and the steering wheel. In this way, in the manual driving mode, since the steering control signal, the accelerator control signal and the brake control signal are generated by the manual operation of the driver, the traveling of the vehicle 1 is controlled by the driver.

Next, the driving mode of the vehicle 1 will be described. The driving mode includes the automated driving mode and the manual driving mode. The automated driving mode includes a fully automated driving mode, an advanced driving support mode and a driving support mode. In the fully automated driving mode, the vehicle system 2 automatically performs all traveling controls including the steering control, the brake control and the accelerator control, and the driver cannot drive the vehicle 1. In the advanced driving support mode, the vehicle system 2 automatically performs all the traveling controls including the steering control, the brake control and the accelerator control, and the driver can drive the vehicle 1 but does not drive the vehicle 1. In the driving support mode, the vehicle system 2 automatically performs a part of the traveling controls including the steering control, the brake control and the accelerator control, and the driver drives the vehicle 1 under driving support of the vehicle system 2. In contrast, in the manual driving mode, the vehicle system 2 does not automatically perform the traveling controls, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among four driving modes (the fully automated driving mode, the advanced driving support mode, the driving support mode and the manual driving mode) according to an operation of the driver on the driving mode switching switch. The driving mode of the vehicle 1 may be automatically switched based on information on a travelable section where the automated driving vehicle can travel or a traveling-prohibited section where traveling of the automated driving vehicle is prohibited, or information on the external weather condition. In this case, the vehicle control unit 3 switches the driving mode of the vehicle 1 based on these pieces of information. The driving mode of the vehicle 1 may be automatically switched by using the seating sensor, the face orientation sensor or the like. In this case, the vehicle control unit 3 switches the driving mode of the vehicle 1 based on a signal output from the seating sensor or the face orientation sensor.

First Embodiment

Figure 4:
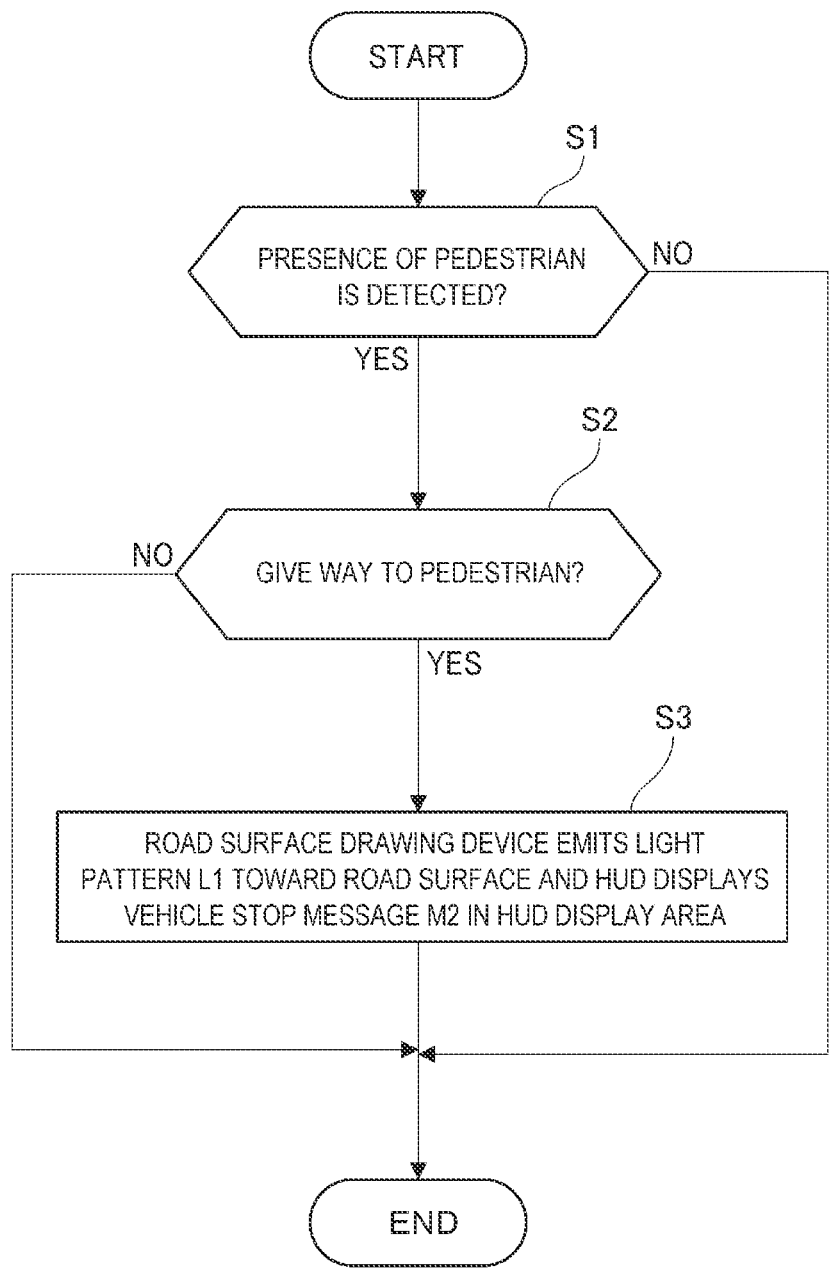
FIG. 4 is a flowchart for explaining an example of an operation of a vehicle system according to a first embodiment.
Figure 5:
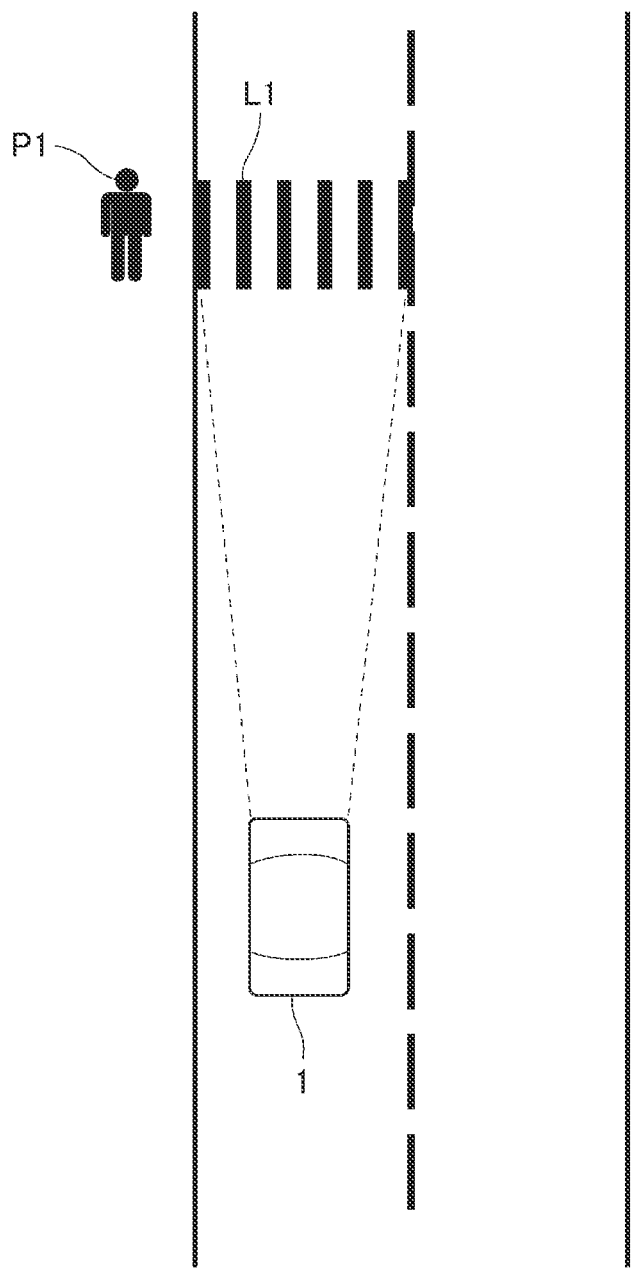
FIG. 5 is a view showing a state in which a vehicle emits a light pattern indicating a crosswalk onto a road surface.
Figure 6:
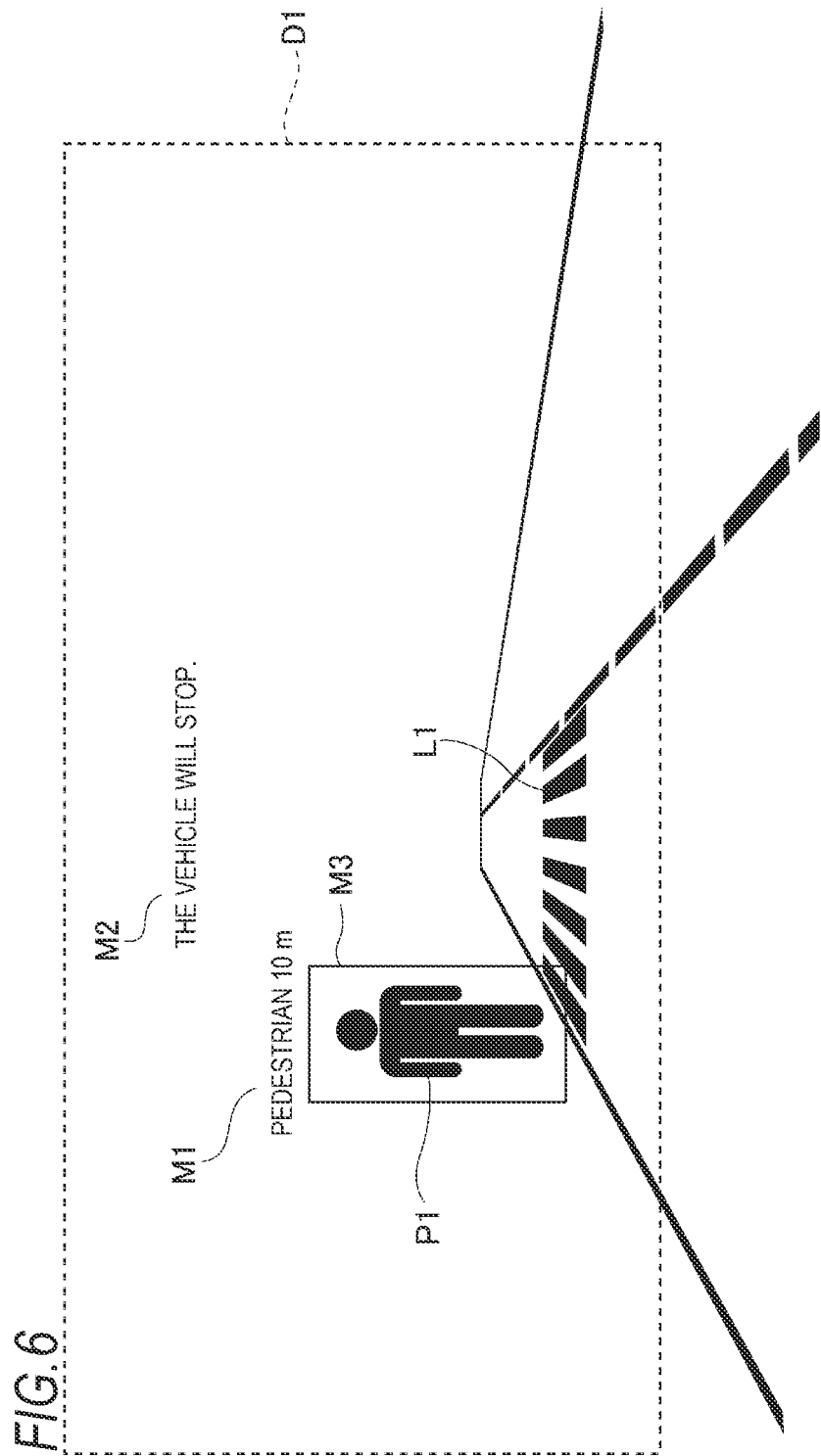
FIG. 6 is a view showing an example of HUD information displayed in a HUD display area.

Next, an example of an operation of the vehicle system 2 according to a first embodiment will be described below with reference to FIGS. 4 to 6. FIG. 4 is a flowchart for explaining an example of the operation of the vehicle system 2. FIG. 5 is a view showing a state in which the vehicle 1 emits a light pattern L1 indicating a crosswalk onto a road surface around a pedestrian P1 (an example of the object). FIG. 6 is a view showing an example of the HUD information displayed in the HUD display area D1.

As shown in FIG. 4, in step S1, the vehicle control unit 3 specifies the surrounding environment information indicating the surrounding environment of the vehicle 1 based on detection data acquired by the external camera 6A and/or the radar 7. In this respect, when the vehicle 1 detects presence of the pedestrian P1 within a predetermined distance from the vehicle 1 (in other words, around the vehicle 1) (YES in step S1), the processing proceeds to step S2. On the other hand, when a determination result of step S1 is NO, the processing ends.

When the determination result of step S1 is YES, the vehicle control unit 3 transmits, to the display control unit 43, an instruction signal for instructing to display information on the object present around the vehicle 1 on the HUD 42, information on the object (for example, attribute information of the object and position information of the object with respect to vehicle 1) and viewpoint position information indicating the position of the viewpoint E of the occupant H. Here, the vehicle control unit 3 acquires the information on the object based on the detection data such as the image data, and acquires the viewpoint position information based on the image data acquired by the internal camera 6B.

Next, the display control unit 43 causes the HUD 42 to display a frame pattern M3 and object-related information M1 as the HUD information in response to the received instruction signal (see FIG. 6). Here, the frame pattern M3 is a frame pattern surrounding the pedestrian P1 (the object). The object-related information M1 includes information indicating an attribute of the object and position information of the object with respect to the vehicle 1. As shown in FIG. 6, the object-related information M1 indicates the pedestrian as the attribute of the object, and 10 m as the position information of the object. The occupant H can clearly grasp the presence of the pedestrian P1 by the frame pattern M3, and can grasp information on the pedestrian P1 by the object-related information M1.

In particular, the display control unit 43 controls the HUD 42 such that the frame pattern M3 is displayed so as to surround the pedestrian P1 in the HUD display area D1 based on the position information of the object and the viewpoint position information. Further, the display control unit 43 controls the HUD 42 such that the object-related information M1 is displayed at a predetermined position in the HUD display area D1 based on the received information on the object. In this respect, the object-related information M1 may be displayed in the HUD display area D1 in a state of being visually associated with the frame pattern M3.

The display control unit 43 may determine a position of the frame pattern M3 based on the position information of the object without referring to the viewpoint position information. In this respect, the display control unit 43 may control driving of the position of the optical system of the HUD 42 (for example, the focal length of the projection optical system) such that a virtual image formation position of the frame pattern M3 substantially coincides with a position of the pedestrian P1. In this case, since the virtual image formation position of the frame pattern M3 substantially coincides with the position of the pedestrian P1, even if the viewpoint E of the occupant H moves, a positional relationship between the frame pattern M3 and the pedestrian P1 in a field of view of the occupant H can be maintained. That is, the frame pattern M3 can be displayed in the field of view of the occupant H so as to surround the pedestrian P1 regardless of the position of the viewpoint E.

Figure 8:
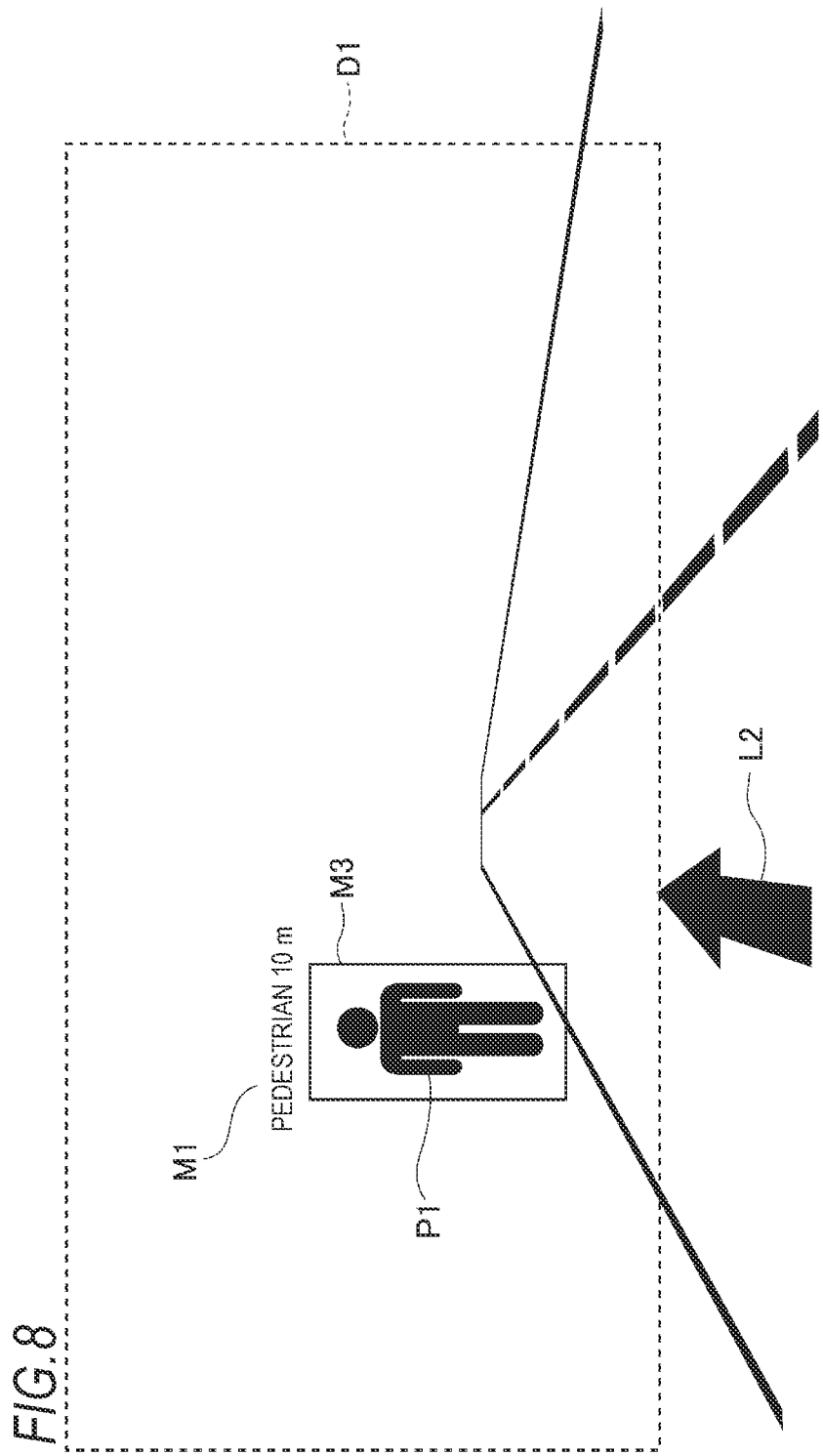
FIG. 8 is a view showing an example of a light pattern indicating a traveling direction of the vehicle.

Next, the vehicle control unit 3 predicts a future behavior of the detected pedestrian P1 based on the detection data such as the image data, and then determines whether to give way to the pedestrian P1 (step S2). When the vehicle control unit 3 determines not to give way to the pedestrian P1 (NO in step S2), the processing ends. In this case, as shown in FIG. 8, the vehicle 1 may emit a light pattern L2 indicating the traveling direction of the vehicle 1 onto the road surface instead of the light pattern L1. In this case, the pedestrian P1 can recognize that the vehicle 1 does not stop by looking at the light pattern L2. On the other hand, when the vehicle control unit 3 determines to give way to the pedestrian P1 (YES in step S2), the processing proceeds to step S3. Next, in step S3, the road surface drawing device 45 emits the light pattern L1 indicating the crosswalk toward the road surface around the pedestrian P1, and the HUD 42 displays a vehicle stop message M2 ("The vehicle will stop.") as the HUD information in the HUD display area D1 (see FIG. 6).

Specifically, the vehicle control unit 3 transmits an instruction signal for instructing to emit the light pattern L1 to a predetermined position ahead of the vehicle 1 to the display control unit 43, and transmits an instruction signal for instructing to display the vehicle stop message M2 on the HUD 42 to the display control unit 43. Next, the display control unit 43 controls the road surface drawing device 45 such that the light pattern L1 is emitted onto the road surface in response to the instruction signal for instructing to emit the light pattern L1. Further, the display control unit 43 causes the HUD 42 to display the vehicle stop message M2.

According to the present embodiment, rich visual communication between the vehicle 1 and the pedestrian P1 can be realized by the light pattern L1 emitted from the road surface drawing device 45, and rich visual communication between the vehicle 1 and the occupant H can be realized by the HUD information (the object-related information M1, the vehicle stop message M2 and the frame pattern M3) displayed by the HUD 42. In particular, since both the light pattern L1 and the vehicle stop message M2 indicate information on the traveling of the vehicle 1 (specifically, a stop notice of the vehicle 1), the information indicated by the light pattern L1 and the vehicle stop message M2 are associated with each other. Therefore, the pedestrian P1 can clearly grasp stop of the vehicle 1 by looking at the light pattern L1 emitted from the road surface drawing device 45. On the other hand, the occupant H can clearly grasp the stop of the vehicle 1 by looking at the vehicle stop message M2 displayed by the HUD 42.

Since the object-related information M1 and the frame pattern M3 are displayed on the HUD 42 as the HUD information, the occupant H can clearly grasp the presence of the pedestrian P1 by the frame pattern M3, and can clearly grasp information on the pedestrian P1 by the object-related information M1.

In the present embodiment, instead of the vehicle stop message M2, predetermined graphic information (for example, a vehicle stop mark) may be displayed on the HUD 42 as the HUD information indicating the stop of the vehicle 1. In particular, the display control unit 43 may cause the HUD 42 to display the graphic information indicating the crosswalk as the HUD information. In this case, the graphic information indicating the crosswalk may be displayed on the HUD 42 (the HUD display area D1) so as to overlap the light pattern L1 when viewed from the occupant H. A display color of the graphic information indicating the crosswalk may be different from a display color of the light pattern L1.

Figure 7:
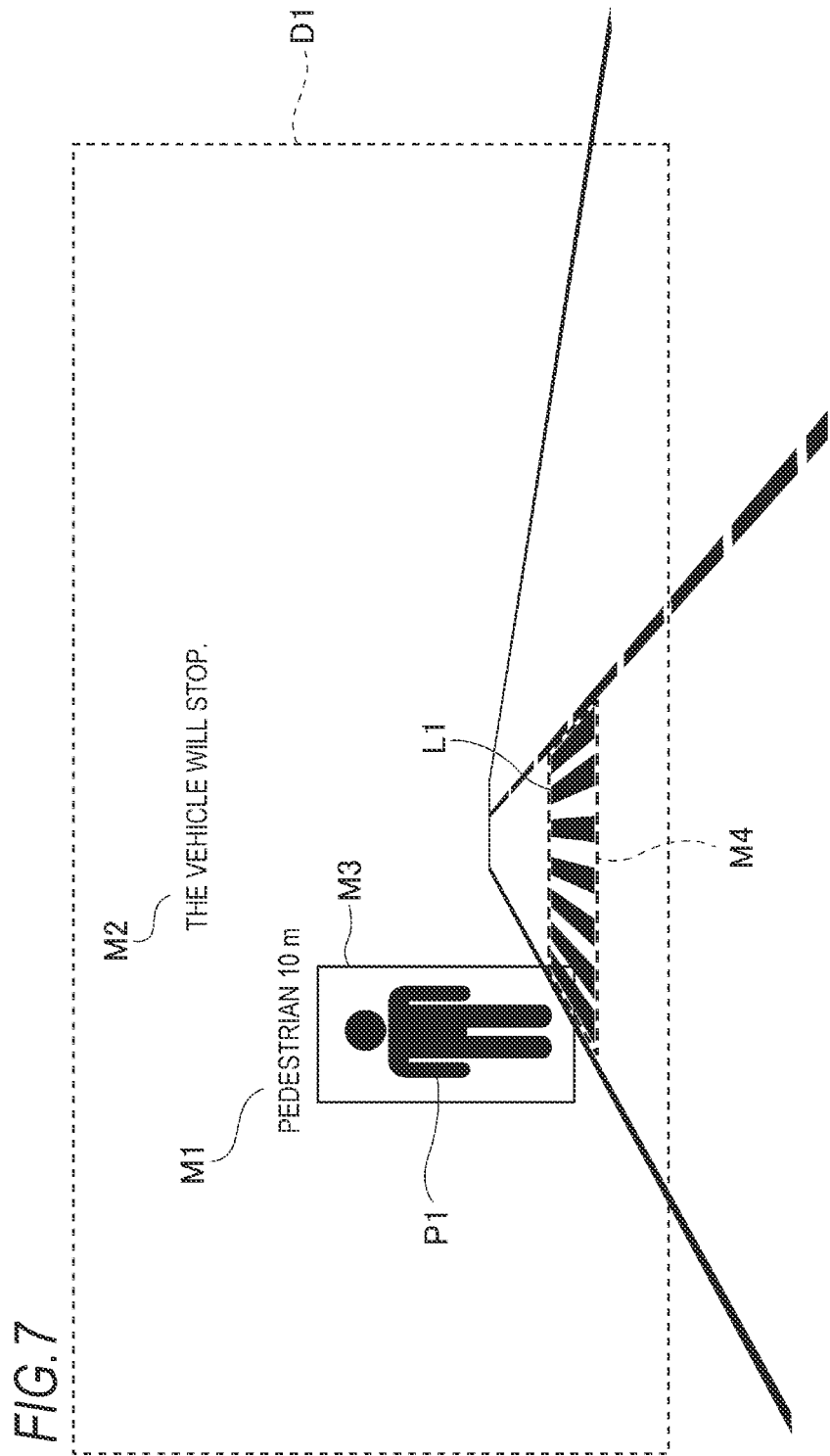
FIG. 7 is a view showing an example of the HUD information and a shielding pattern displayed in the HUD display area.

As shown in FIG. 7, the display control unit 43 may cause the HUD 42 to display a shielding pattern M4 for hiding the light pattern L1 as the HUD information. In this case, the shielding pattern M4 may be displayed on the HUD 42 so as to overlap the light pattern L1 when viewed from the occupant H. Further, a display color of the shielding pattern M4 may be the same as a background color of the real space ahead of the vehicle 1. In this respect, the display color of the shielding pattern M4 may be the same as a color of the road surface (for example, gray). In this way, the occupant H can be prevented from viewing the light pattern L1 by the shielding pattern M4 having the display color the same as the background color of the real space. Therefore, it is possible to prevent a misunderstanding from occurring in the visual communication between the occupant H and the vehicle 1 due to the light pattern L1 presented to the pedestrian P1.

Figure 9:
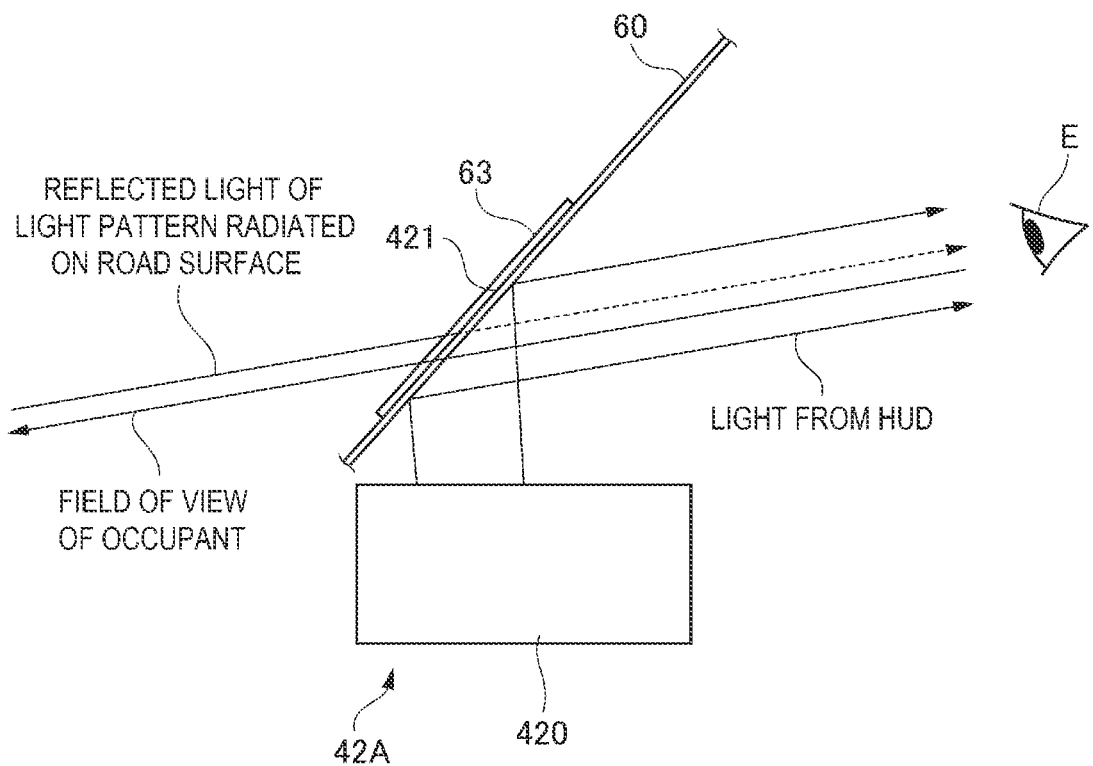
FIG. 9 is a view showing a liquid crystal shutter disposed on a front window

Next, a modification of the HUD 42 will be described with reference to FIG. 9. FIG. 9 is a view showing a liquid crystal shutter 63 disposed on the front window 60. As shown in FIG. 9, a HUD 42A includes the HUD main body 420, the transparent screen 421 and the liquid crystal shutter 63. The liquid crystal shutter 63 is disposed so as to face the transparent screen 421 (more specifically, the HUD display area D1) formed by a part of the front window 60. The liquid crystal shutter 63 functions as a transmittance adjustment unit capable of adjusting a transmittance of light passing through the liquid crystal shutter 63. The liquid crystal shutter 63 includes, for example, two polarizing filters and a liquid crystal layer provided between the two polarizing filters. One of the two polarizing filters may be configured to allow the light polarized in a predetermined direction to pass therethrough, while the other of the two polarizing filters may be configured to allow the light polarized in a direction perpendicular to the predetermined direction to pass therethrough. When a voltage is applied to the liquid crystal layer, an alignment direction of liquid crystal molecules in the liquid crystal layer changes, so that the transmittance of the light passing through the liquid crystal shutter 63 can be adjusted. In particular, the display control unit 43 can lower the transmittance of the liquid crystal shutter 63 by adjusting the voltage applied to the liquid crystal layer. In this way, the occupant H can be prevented from viewing the reflected light of the light pattern radiated on the road surface by lowering the transmittance of the liquid crystal shutter 63. On the other hand, in this state, the occupant H can clearly view light (the HUD information) emitted from the HUD main body 420. In this way, by using the liquid crystal shutter 63, it is possible to prevent a misunderstanding from occurring in the communication between the occupant H and the vehicle 1 due to the light pattern presented to the pedestrian P1.

Second Embodiment

Figure 10:
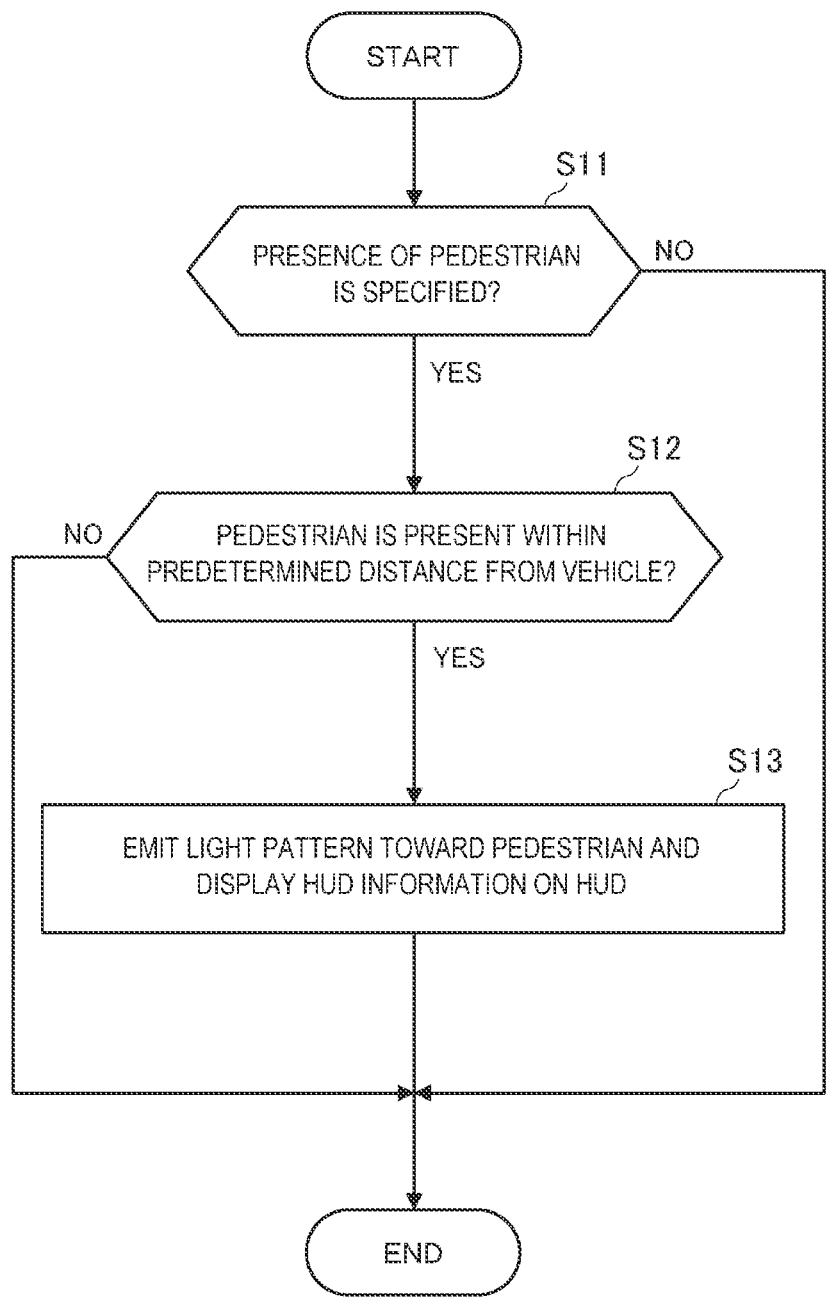
FIG. 10 is a flowchart for explaining an example of an operation of a vehicle system according to a second embodiment.
Figure 11:
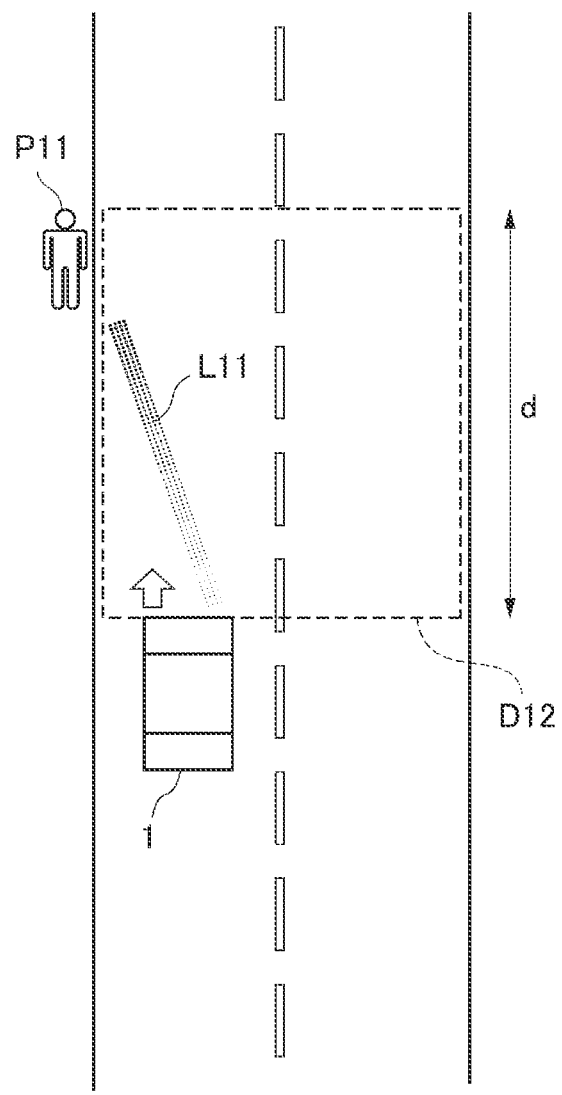
FIG. 11 is a view showing a state in which a vehicle emits a light pattern indicating a presence position of a pedestrian onto a road surface.
Figure 12:
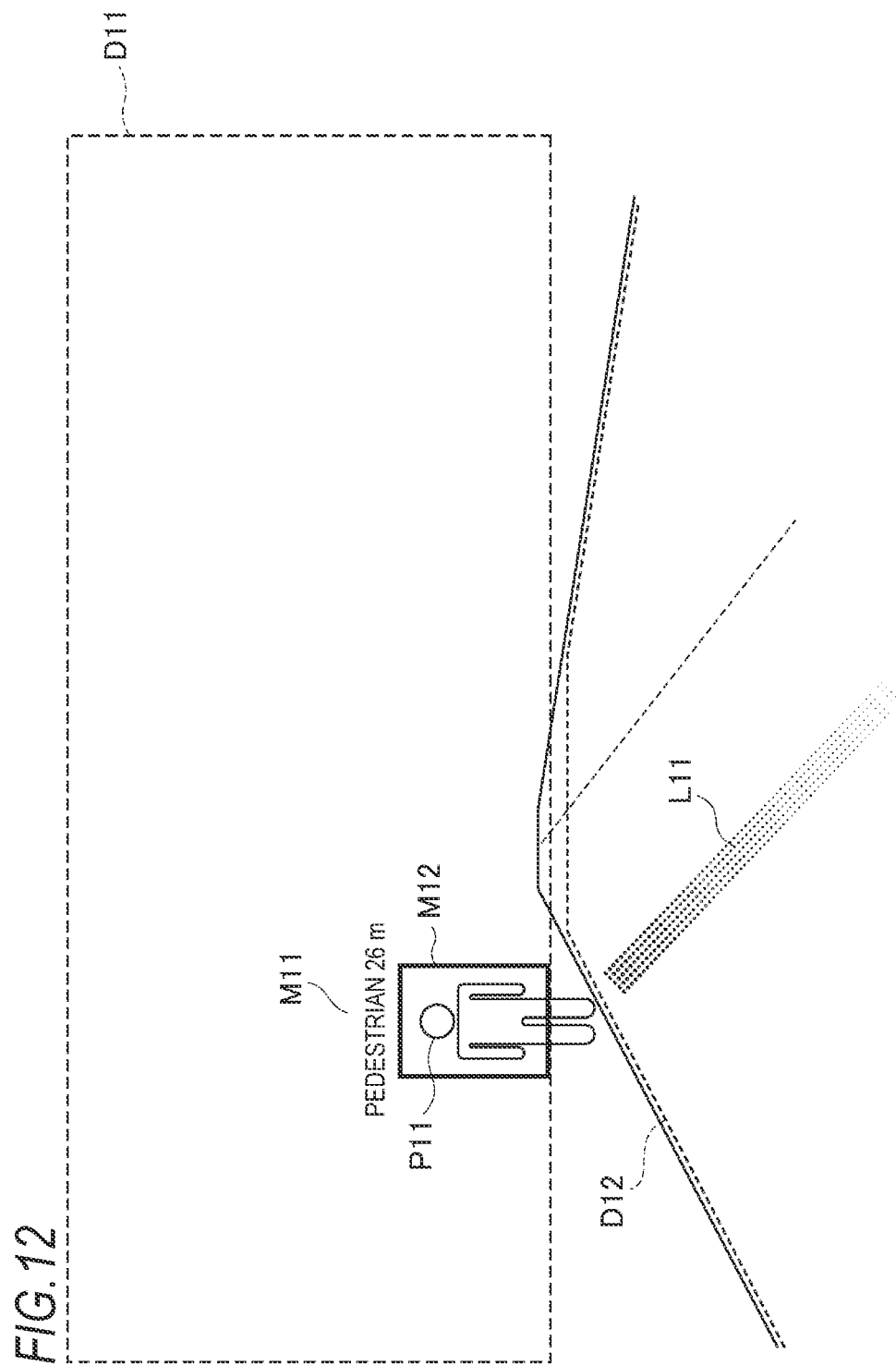
FIG. 12 is a view (part 1) showing an example of HUD information and the light pattern in a field of view of an occupant.

Next, an example of an operation of the vehicle system 2 according to a second embodiment will be described with reference to FIGS. 10 to 12. FIG. 10 is a flowchart for explaining the example of the operation of the vehicle system 2. FIG. 11 is a view showing a state in which the vehicle 1 emits a light pattern L11 indicating a presence position of a pedestrian P11 onto a road surface toward the pedestrian P11 (an example of an object). FIG. 12 is a view showing HUD information (specifically, object-related information M11 and a frame pattern M12) and the light pattern L11 in a field of view of the occupant H.

As shown in FIG. 10, in step S11, the vehicle control unit 3 specifies surrounding environment information indicating a surrounding environment of the vehicle 1 based on detection data acquired by the external camera 6A and/or the radar 7. Next, when presence of the pedestrian P11 is specified based on the surrounding environment information (YES in step S11), the vehicle control unit 3 determines whether the pedestrian P11 is present within a predetermined distance from the vehicle 1 (step S12). On the other hand, when a determination result of step S11 is NO, the processing ends.

Next, when determining that the pedestrian P11 is present within the predetermined distance from the vehicle 1 (YES in step S12), the vehicle control unit 3 transmits, to the display control unit 43, a first instruction signal for instructing to display the HUD information on the HUD 42 and a second instruction signal for instructing to emit the light pattern L11 toward the pedestrian P11 in step S13. Further, in step S13, the vehicle control unit 3 transmits, to the display control unit 43, information on the object (for example, attribute information of the object and position information of the object with respect to the vehicle 1) and viewpoint position information indicating a position of the viewpoint E of the occupant H. Here, the vehicle control unit 3 acquires the information on the object based on the detection data such as image data, and acquires the viewpoint position information based on image data acquired by the internal camera 6B.

Next, the display control unit 43 causes the HUD 42 to display the object-related information M11 and the frame pattern M12 as the HUD information in response to the received first instruction signal (see FIG. 12). Here, the object-related information M11 includes information indicating an attribute of the object and the position information of the object with respect to the vehicle 1. As shown in FIG. 12, the object-related information M11 indicates a pedestrian as the attribute of the object, and 26 m as the position information of the object.

The frame pattern M12 is a frame pattern surrounding the pedestrian P11 (the object). The occupant H can clearly grasp the presence of the pedestrian P11 by looking at the frame pattern M12, and can grasp information on the pedestrian P11 by the object-related information M11. The display control unit 43 controls the HUD 42 such that the frame pattern M12 is displayed so as to surround the pedestrian P11 in the HUD display area D11 based on the position information of the object and the viewpoint position information. Further, the display control unit 43 controls the HUD 42 such that the object-related information M11 is displayed at a predetermined position in the HUD display area D11 based on the received information on the object. In this respect, the object-related information M11 may be displayed in the HUD display area D11 in a state of being visually associated with the frame pattern M12.

The display control unit 43 may determine a position of the frame pattern M12 based on the position information of the object without referring to the viewpoint position information. In this respect, the display control unit 43 may control driving of a position of an optical system of the HUD 42 (for example, a focal length of a projection optical system included in the HUD main body 420) such that a virtual image formation position of the frame pattern M12 substantially coincides with a position of the pedestrian P11. In this case, since the virtual image formation position of the frame pattern M12 substantially coincides with the position of the pedestrian P11, even if the viewpoint E of the occupant H moves, a positional relationship between the frame pattern M12 and the pedestrian P11 in the field of view of the occupant H can be maintained. That is, the frame pattern M12 can be displayed in the field of view of the occupant H so as to surround the pedestrian P11 regardless of the position of the viewpoint E.

On the other hand, in step S13, the display control unit 43 controls the road surface drawing device 45 such that the road surface drawing device 45 emits the light pattern L11 onto the road surface toward the pedestrian P11 in response to the received second instruction signal. A shape of the light pattern L11 is not limited to a linear shape, and may be any shape such as a triangular shape or an arrow shape.

As shown in FIG. 12, in the field of view of the occupant H, the HUD display area D11 where the HUD information can be displayed is set such that the HUD display area D11 is located above a light pattern area D12 (an example of a second area) where the light pattern emitted onto the road surface can be present. Here, the field of view of the occupant H is a field of view from the viewpoint E of the occupant H. In particular, in the example shown in FIG. 12, within the field of view of the occupant H, the HUD display area D11 is located above the light pattern area D12 so as not to overlap the light pattern area D12. In this respect, the light pattern area D12 includes a road surface within a distanced (an example of a first distance) from a front end of the vehicle 1, while the HUD display area D11 includes a road surface exceeding the distance d from the front end of the vehicle 1. See FIG. 11 for the distance d. For example, when the distance d is 30 m, the light pattern area D12 includes the road surface within 30 m from the front end of the vehicle 1, while the HUD display area D11 includes the road surface exceeding 30 m from the front end of the vehicle 1.

In this way, according to the present embodiment, when the display system 4 emits the light pattern L11 onto the road surface and the HUD information is displayed on the HUD 42 (the HUD display area D11), the HUD display area D11 is set such that the HUD display area D11 is located above the light pattern area D12 in the field of view of the occupant H. Therefore, the HUD information and the light pattern L11 can be viewed by the occupant H in a state of being clearly distinguished from each other. In this way, it is possible to provide the display system 4 capable of improving visibility to the occupant H of the light pattern L11 emitted onto the road surface and the HUD information.

Although the light pattern area D12 shown in FIG. 11 includes only a road surface of a roadway, the light pattern area D12 may include not only the road surface of the roadway but also a road surface of a sidewalk. In this case, the light pattern L11 may extend from a predetermined position on the road surface of the roadway to vicinity of feet of the pedestrian P11.

First Modification

Figure 13:
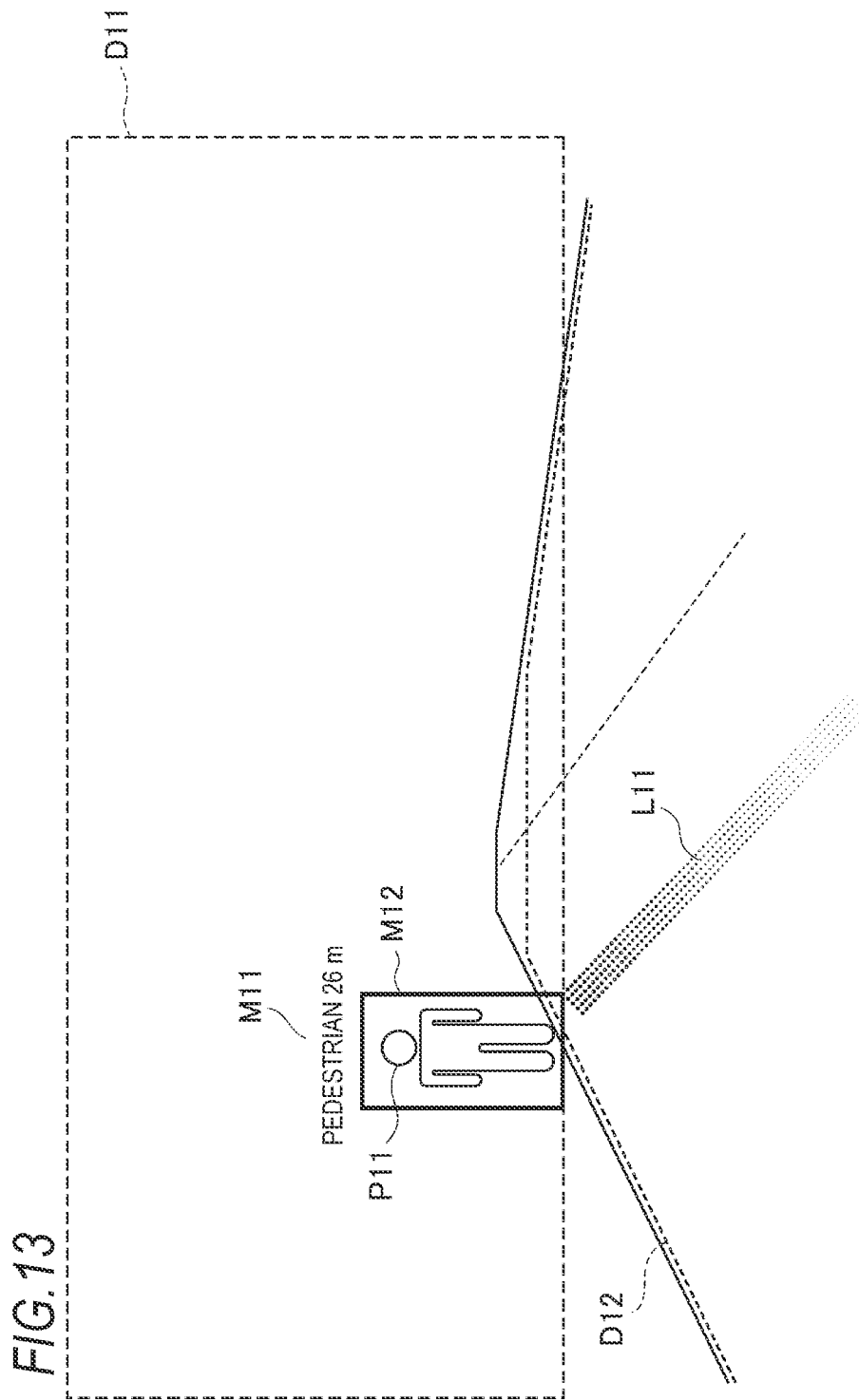
FIG. 13 is a view (part 2) showing the example of the HUD information and the light pattern in the field of view of the occupant.

Next, a modification of the HUD display area D11 will be described below with reference to FIG. 13. FIG. 13 is a view showing HUD information (the object-related information M11 and the frame pattern M12) and the light pattern L11 in a field of view of the occupant H. In the present modification, the HUD display area D11 partially overlaps the light pattern area D12, and is different from the HUD display area D11 shown in FIG. 12 in that the frame pattern M12 surrounds the entire body of the pedestrian P11. In this respect, the light pattern area D12 includes a road surface within the distance d from a front end of the vehicle 1, while the HUD display area D11 includes a road surface exceeding a distance d2 (an example of a second distance) from the front end of the vehicle 1. Here, the distance d2 is smaller than the distance d. For example, when the distance d is 30 m, the distance d2 is 25 m. In this case, the light pattern area D12 includes a road surface within 30 m from the front end of the vehicle 1, while the HUD display area D11 includes a road surface exceeding 25 m from the front end of the vehicle 1.

In this way, since the HUD display area D11 partially overlaps the light pattern area D12 and the HUD display area D11 is located above the light pattern area D12 within the field of view of the occupant H, the HUD information and the light pattern can be viewed by the occupant in a state of being distinguished from each other. In this way, visibility to the occupant H of the light pattern L11 and the HUD information can be improved. As shown in FIG. 13, the light pattern L11 and the frame pattern M12 can be visually associated with each other (in other words, the light pattern L11 and the frame pattern M12 are connected to each other when viewed from the occupant H). Therefore, the occupant H can clearly grasp presence of the pedestrian P11 by looking at the light pattern L11, and can clearly grasp information on the pedestrian P11 by looking at the HUD information. In this way, the occupant H can simultaneously grasp a presence position of the pedestrian P11 and the information on the pedestrian P11.

Third Embodiment

Figure 14:
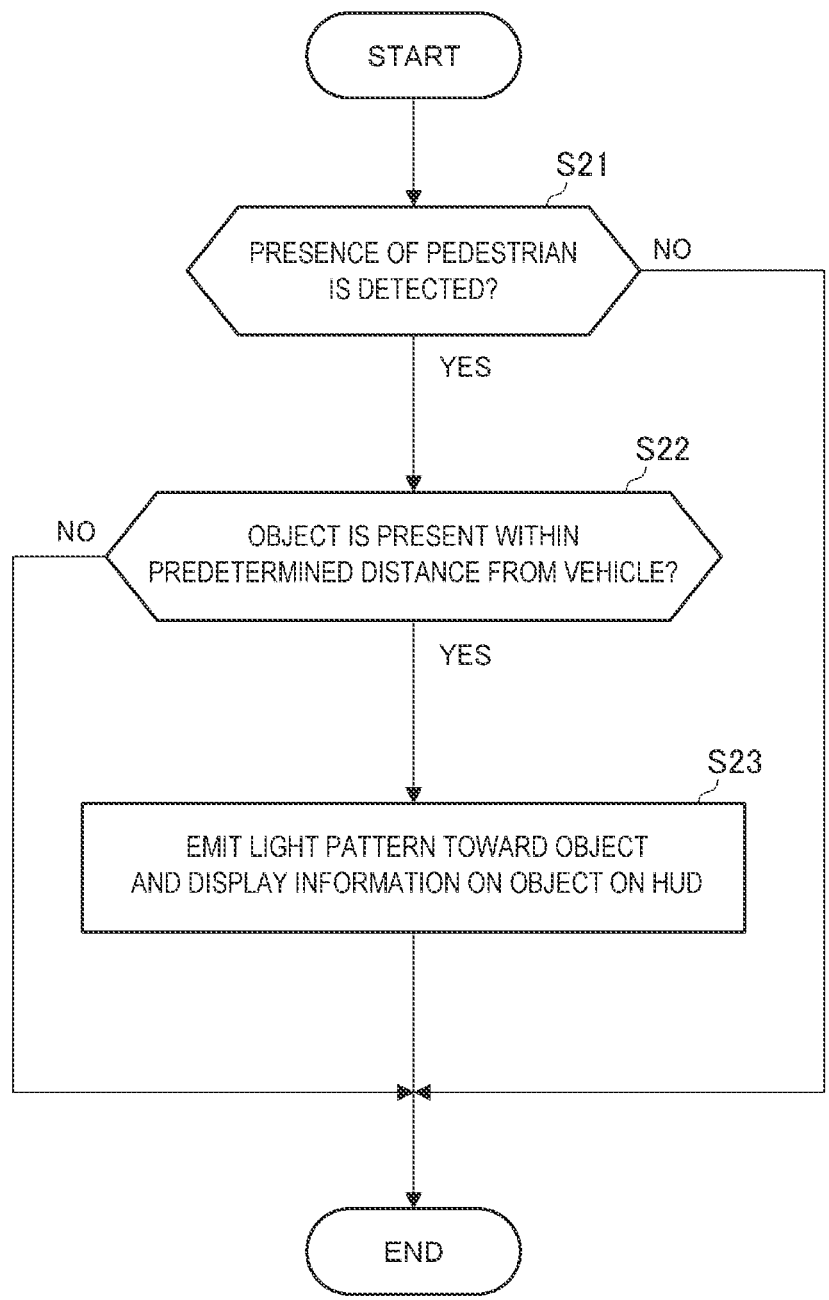
FIG. 14 is a flowchart for explaining an operation example of a display system according to a third embodiment.
Figure 15:
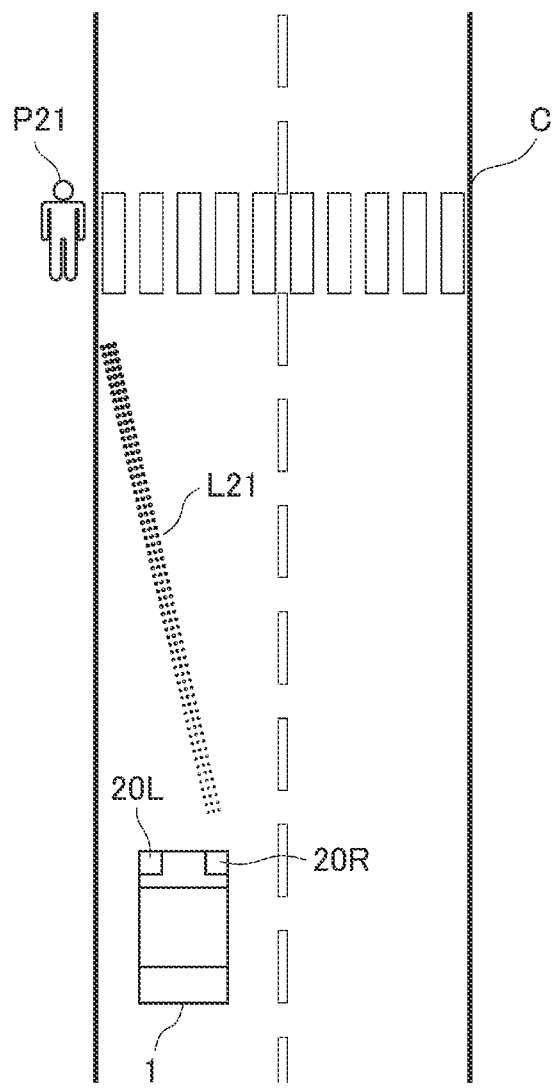
FIG. 15 is a view showing a state in which a vehicle emits a light pattern toward a pedestrian present around the vehicle.
Figure 16:
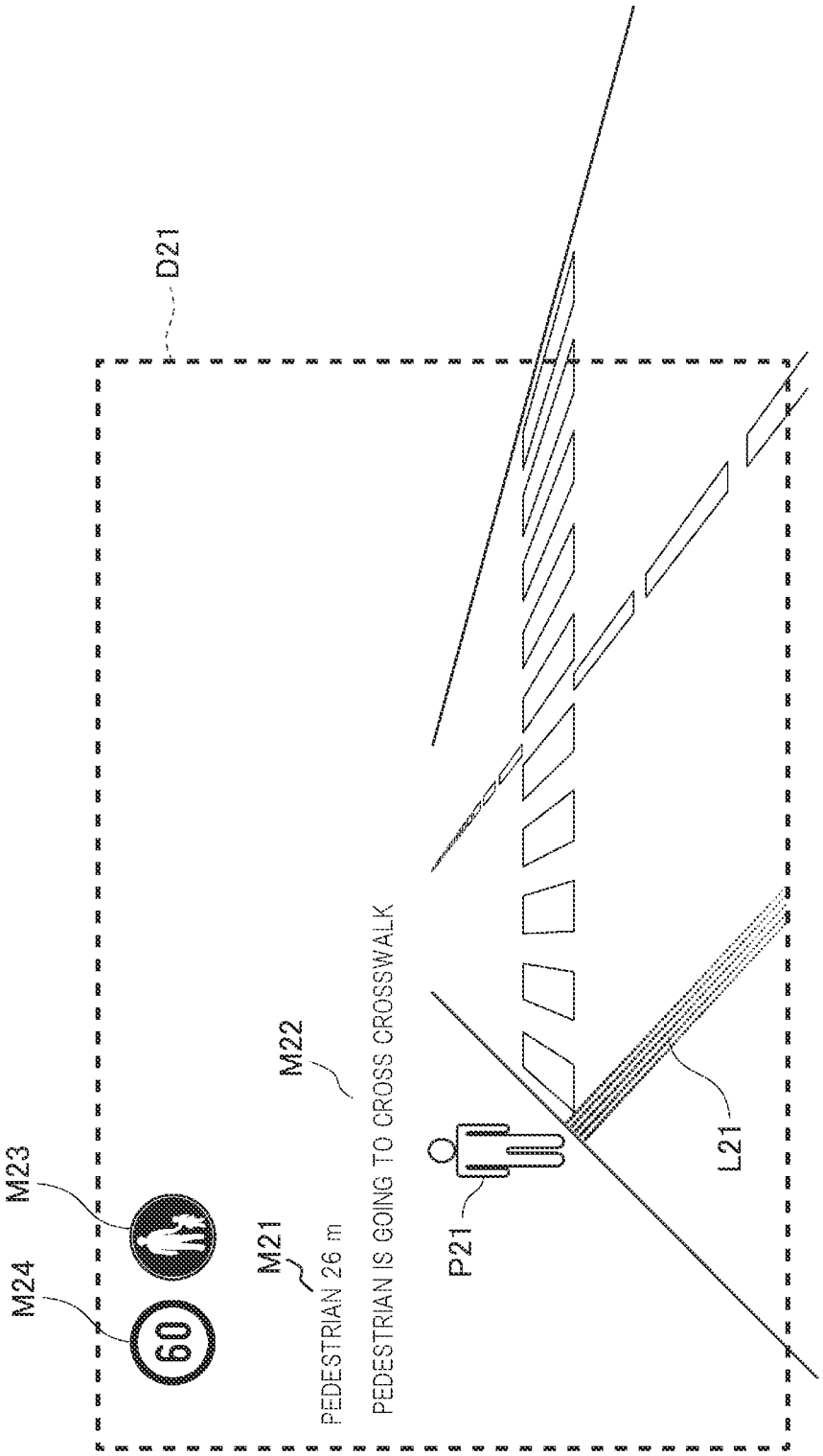
FIG. 16 is a view showing an example of HUD information displayed in a HUD display area.

Next, an operation example of the display system 4 of a third embodiment will be described below with reference mainly to FIGS. 14 to 16. FIG. 14 is a flowchart for explaining the operation example of the display system 4. FIG. 15 is a view showing a state in which the vehicle 1 emits a light pattern L21 toward a pedestrian P21 (an example of an object) present around the vehicle 1. FIG. 16 is a view showing an example of HUD information displayed in a HUD display area D21. In particular, FIG. 16 shows HUD information M21 to M24 in a field of view of the occupant H and the light pattern L21 emitted onto a road surface.

As shown in FIG. 14, in step S21, the vehicle control unit 3 specifies surrounding environment information indicating a surrounding environment of the vehicle 1 based on detection data acquired by the external camera 6A and/or the radar 7. Next, when presence of the pedestrian P21 is specified based on the surrounding environment information (YES in step S21), the vehicle control unit 3 determines whether the pedestrian P21 is present within a predetermined distance from the vehicle 1 (step S22). On the other hand, when a determination result of step S21 is NO, the processing ends.

Next, when determining that the pedestrian P21 is present within the predetermined distance from the vehicle 1 (YES in step S22), the vehicle control unit 3 transmits, to the display control unit 43, a first instruction signal for instructing to display the HUD information on the HUD 42 and a second instruction signal for instructing to emit the light pattern L21 toward the pedestrian P21 in step S23. Further, in step S23, the vehicle control unit 3 transmits, to the display control unit 43, information (for example, attribute information of the object, position information of the object with respect to the vehicle 1, and information on a future behavior of the object) on the object (the pedestrian P21 in this example). Here, the vehicle control unit 3 acquires the information on the object based on detection data such as image data and 3D mapping data.

Next, the display control unit 43 causes the HUD 42 to display the HUD information M21 to M23 in response to the received first instruction signal (see FIG. 16). Here, HUD information M21 includes the attribute information of the object and the position information of the object with respect to the vehicle 1. As shown in FIG. 16, the HUD information M21 indicates a pedestrian as the attribute information of the object, and 26 m as the position information of the object. The HUD information M22 includes the information on behavior prediction of the object. As shown in FIG. 16, the HUD information M22 indicates that the pedestrian P21 is going to cross a crosswalk C as behavior prediction information of the pedestrian P21.

The HUD information M23 includes information indicating the presence of the object. As shown in FIG. 16, the HUD information M23 indicates a pedestrian mark as the information indicating the presence of the pedestrian P21. The HUD information M23 may include text information such as "a pedestrian is present" and graphic information such as an exclamation mark as the information indicating the presence of the object. The HUD information M24 includes speed limit information of a road on which the vehicle 1 is traveling. As shown in FIG. 16, the HUD information M24 indicates a speed limit of 60 km/h. The HUD information M24 may be displayed in the HUD display area D21 regardless of whether the presence of the object is detected.

On the other hand, in step S23, the display control unit 43 controls the road surface drawing device 45 such that the road surface drawing device 45 emits the light pattern L21 onto the road surface toward the pedestrian P21 in response to the received second instruction signal. As shown in FIG. 15, the light pattern L21 is a linear light pattern extending from the vehicle 1 toward the pedestrian P21. In this way, the light pattern L21 can visually associate the vehicle 1 with the pedestrian P21. Further, the occupant H of the vehicle 1 can clearly grasp the presence of the pedestrian P21 by viewing the light pattern L21. A shape of the light pattern L21 is not limited to a linear shape, and may be any shape such as a triangular shape or an arrow shape.

As shown in FIG. 15, when the pedestrian P21 is present on a left side of the vehicle 1, the right road surface drawing device 45R mounted on the right headlamp 20R may emit the light pattern L21 toward the pedestrian P21. On the other hand when the pedestrian P21 is present on a right side of the vehicle, the left road surface drawing device 45L mounted on the left headlamp 20L may emit the light pattern L21 toward the pedestrian P21. In this case, since an inclination angle of the light pattern L21 with respect to a traveling direction of the vehicle is increased, visibility of the light pattern L21 can be improved.

In this way, according to the present embodiment, when the pedestrian P21 present around the vehicle 1 is detected, the road surface drawing device 45 emits the light pattern L21 toward the pedestrian P21, and the HUD 42 displays the HUD information M21 to M23 on the pedestrian P21 in the HUD display area D21. Therefore, the occupant H of the vehicle 1 can grasp a position of the pedestrian P21 by looking at the light pattern L21 emitted from the road surface drawing device 45, and can grasp the information on the pedestrian P21 through the HUD 42. In this way, since the position of the pedestrian P21 and the information on the pedestrian P21 are visually presented to the occupant H using two different display devices that are the road surface drawing device 45 and the HUD 42, the occupant H can clearly view the pedestrian P21. In particular, when the occupant H controls the traveling of the vehicle 1 (in other words, when the vehicle 1 is traveling in a manual driving mode), the occupant H can perform appropriate traveling control on the vehicle 1 in consideration of the future behavior of the pedestrian P21 by looking at the HUD information M22. For example, the occupant H may decide to stop the vehicle 1 in front of the crosswalk C through the HUD information M22 indicating that the pedestrian P21 is going to cross the crosswalk C.

Figure 17:
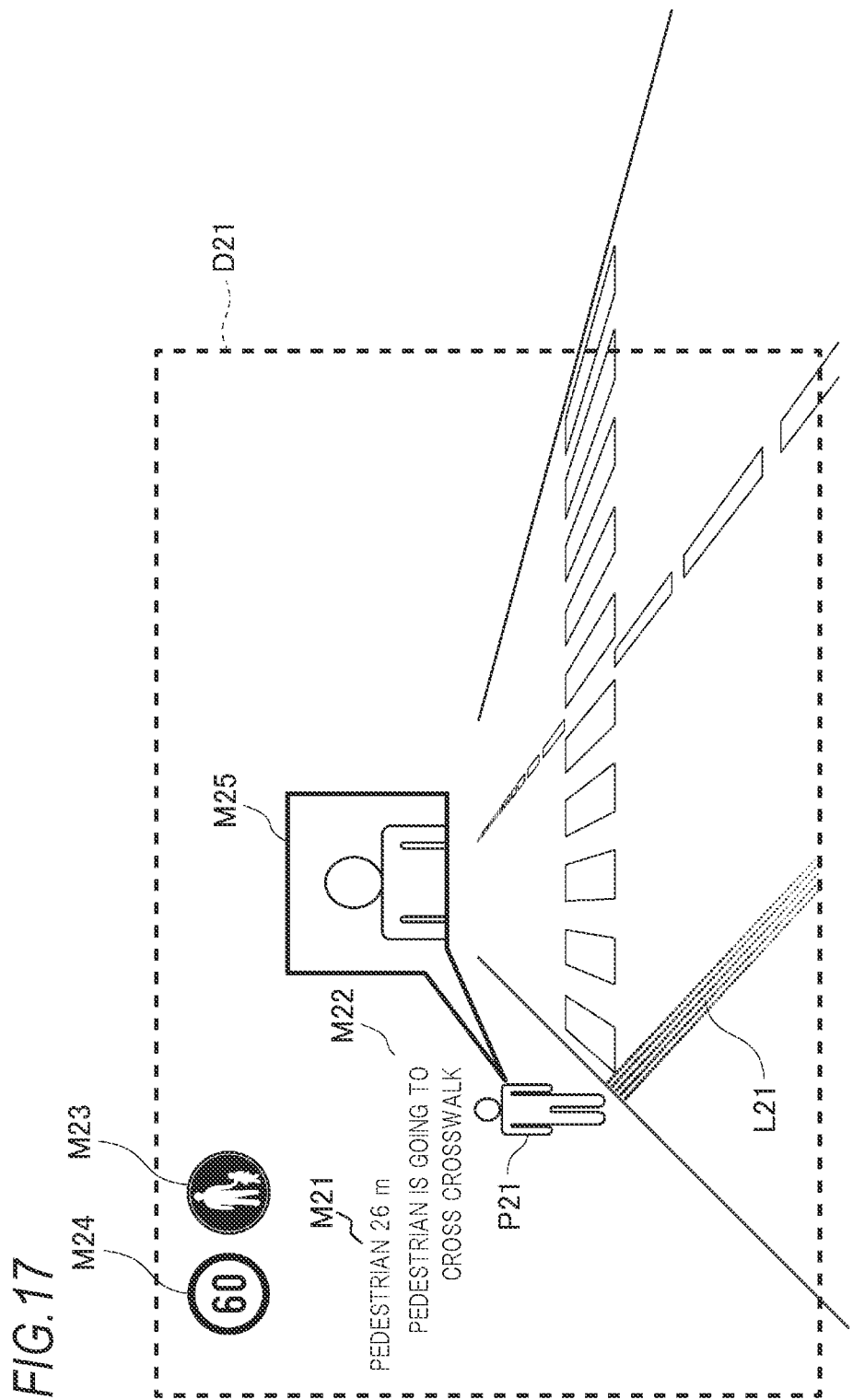
FIG. 17 is a view showing an example of an enlarged image of the pedestrian displayed in the HUD display area.

As shown in FIG. 17, when the pedestrian P21 is detected, HUD information M25 indicating an enlarged image of the pedestrian P21 may be displayed in the HUD display area D21. In this case, the display control unit 43 acquires image data indicating the surrounding environment of the vehicle 1 captured by the external camera 6A from the vehicle control unit 3, and controls the HUD 42 such that the HUD information M25 indicating the enlarged image of the pedestrian P21 is displayed in the HUD display area D21 based on the acquired image data. In this way, the occupant H can clearly recognize the pedestrian P21 by looking at the enlarged image of the pedestrian P21.

Figure 18:
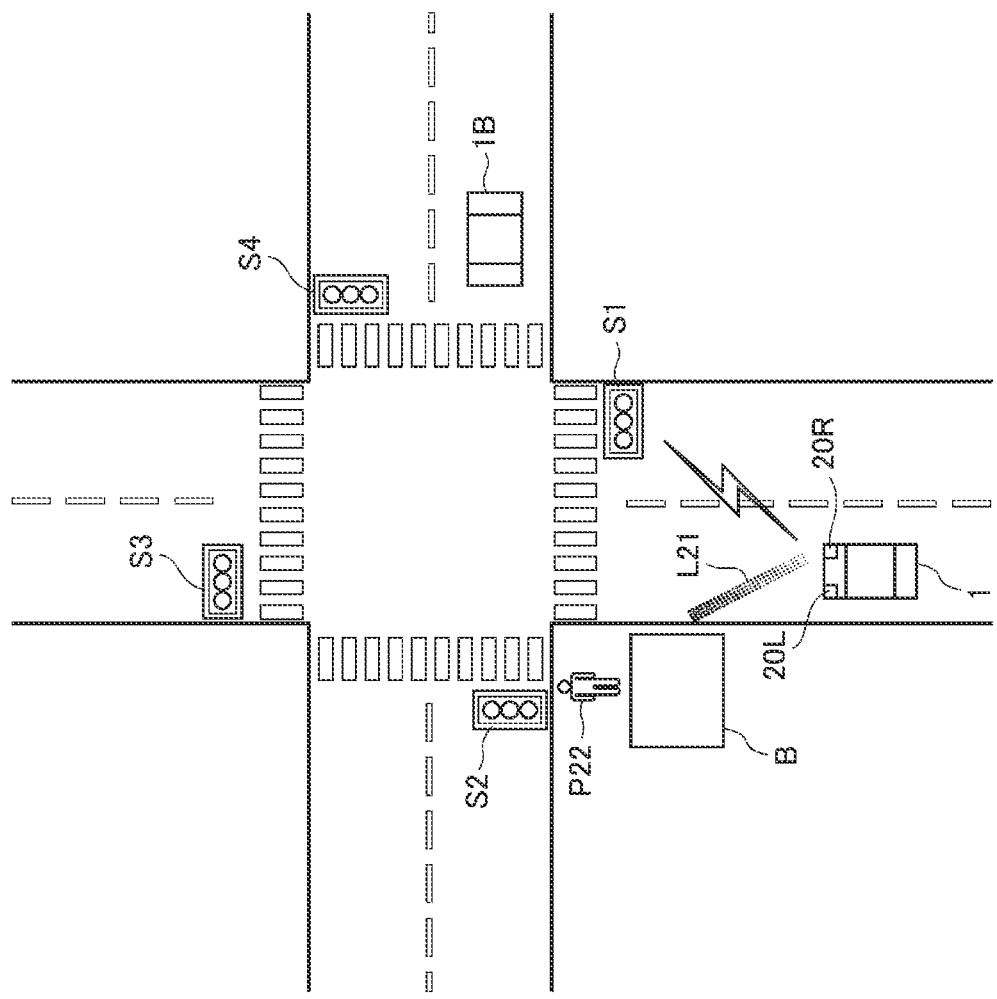
FIG. 18 is a view showing a state in which the vehicle receives information on a pedestrian from a traffic light installed around the vehicle.

In the present embodiment, the presence of the object such as the pedestrian is detected based on the detection data (for example, the image data) acquired from an in-vehicle sensor such as the external camera 6A, but the presence of the object may be detected through road-vehicle communication or inter-vehicle communication. For example, as shown in FIG. 18, since a pedestrian P22 is hidden behind a building B, it is assumed that the in-vehicle sensor mounted on the vehicle 1 cannot detect the pedestrian P22. In this case, the vehicle 1 may receive information on the pedestrian P22 from at least one of traffic lights S1 to S4 (an example of an external communication device) present around the vehicle 1. Alternatively, the vehicle 1 may receive the information on the pedestrian P22 from the other vehicle 1B (an example of the external communication device) present around the vehicle 1. Each of the traffic lights S1 to S4 and the other vehicle 1B includes a camera configured to acquire image data indicating the surrounding environment, and a wireless communication unit.

In the example shown in FIG. 18, first, the traffic light S1 as an example of traffic infrastructure equipment, acquires the information on the pedestrian P22 based on the image data acquired by the camera. The information on the pedestrian P22 may include at least one of position information of the pedestrian P22, attribute information of the pedestrian P22 and behavior prediction information of the pedestrian P22. Next, the traffic light S1 broadcasts the information on the pedestrian P22 to outside through the wireless communication unit. When the vehicle 1 is located in an area where the information broadcasted from the traffic light S1 can be received, the vehicle control unit 3 of the vehicle 1 receives the information on the pedestrian P22 from the traffic light S1 through the wireless communication unit 10. Thereafter, based on the information on the pedestrian P22, the display control unit 43 controls the road surface drawing device 45 such that the light pattern L21 is emitted toward the pedestrian P22, and causes the HUD 42 to display HUD information M26 indicating presence of the pedestrian P22 (see FIG. 19). As shown in FIG. 19, the occupant H can recognize a position of the pedestrian P22 hidden behind the building B by looking at the light pattern L21 and the HUD information M26.

In this way, even if the in-vehicle sensor such as a camera mounted on the vehicle 1 and/or the occupant H cannot detect the pedestrian P22 (that is, even if the pedestrian P22 is present in a place invisible to the vehicle 1), the vehicle 1 can acquire information on the pedestrian P22 through the road-vehicle communication or inter-vehicle communication, and the occupant H of the vehicle 1 can clearly grasp the presence of the pedestrian P22 through the road surface drawing device 45 and the HUD 42.

In the present embodiment, the light pattern L21 emitted toward the pedestrian P21 has been described as a light pattern that visually associates the vehicle 1 with the pedestrian P21, but the light pattern of the present embodiment is not limited thereto. For example, as shown in FIG. 20, the light pattern emitted from the road surface drawing device 45 may be a light pattern L22 that visually associates the HUD information M25 indicating the enlarged image of the pedestrian P21 with the pedestrian P21. In this case, the HUD information M25 may be displayed on a lower side of the HUD display area D21. After determining a display position of the HUD information M25, the display control unit 43 may determine an emission position of the light pattern L22 such that the pedestrian P21 and the HUD information M25 are visually associated with each other by the light pattern L22. Alternatively, after determining the emission position of the light pattern L22, the display control unit 43 may determine the display position of the HUD information M25 such that the pedestrian P21 and the HUD information M25 are visually associated with each other by the light pattern L22.

Although the embodiments of the present invention have been described above, it is needless to say that the technical scope of the present invention should not be interpreted as being limited to the description of the embodiments. It is to be understood by those skilled in the art that the present embodiments are merely examples and various modifications can be made within the scope of the invention described in the claims. The technical scope of the present invention should be determined based on the scope of the invention described in the claims and the scope of equivalents thereof.

In the present embodiments, a driving mode of the vehicle is described as including the fully automated driving mode, the advanced driving support mode, the driving support mode and the manual driving mode, but the driving mode of the vehicle should not be limited to these four modes. Classification of the driving mode of the vehicle may be appropriately changed according to laws or regulations related to automated driving in each country. Similarly, definitions of the "fully automated driving mode", the "advanced driving support mode" and the "driving support mode" in the description of the present embodiments are merely examples and may be appropriately changed according to the laws or regulations related to the automated driving in each country.

The present application appropriately cites the contents disclosed in Japanese Patent Application No. 2018-147733 filed on Aug. 6, 2018, the contents disclosed in Japanese Patent Application No. 2018-147736 filed on Aug. 6, 2018, and the contents disclosed in Japanese Patent Application No. 2018-152901 filed on Aug. 15, 2018.

The invention claimed is:

1. A vehicle display system provided in a vehicle, the vehicle display system comprising:
a first display device configured to emit a light pattern toward a road surface outside the vehicle; and
a second display device located inside the vehicle and configured to display predetermined information toward an occupant of the vehicle such that the predetermined information is superimposed on a real space outside the vehicle,
wherein the second display device is a head-up display, and
wherein the head-up display is further configured to display a shielding pattern different from the predetermined information so as to overlap and hide the light pattern when viewed from the occupant.

2. The vehicle display system according to claim 1,
wherein information indicated by the light pattern and the predetermined information are associated with each other.

3. The vehicle display system according to claim 2,
wherein the light pattern and the predetermined information indicate information on traveling of the vehicle.

4. The vehicle display system according to claim 1,
wherein the light pattern indicates information on traveling of the vehicle, while the predetermined information indicates information on an object present around the vehicle.

5. The vehicle display system according to claim 1,
wherein the predetermined information is displayed so as to overlap the light pattern when viewed from the occupant, and
wherein a display color of the predetermined information is different from a display color of the light pattern.

6. The vehicle display system according to claim 1,
wherein the shielding pattern has a display color the same as a background color of the real space.

7. The vehicle display system according to claim 1,
wherein the second display device includes a transmittance adjustment unit disposed so as to face a display area where the predetermined information is displayed.

8. A vehicle display system provided in a vehicle, the vehicle display system comprising:
a first display device configured to emit a light pattern toward a road surface outside the vehicle; and
a second display device as a head-up display located inside the vehicle and configured to display predetermined information toward an occupant of the vehicle such that the predetermined information is superimposed on a real space outside the vehicle,
wherein in a field of view of the occupant, a first area as a HUD display area where the predetermined information can be displayed is set such that the first area is located above a second area as a light pattern area where the light pattern emitted onto the road surface can be present, and
wherein the head-up display is further configured to display a shielding pattern different from the predetermined information so as to overlap and hide the light pattern when viewed from the occupant.

9. The vehicle display system according to claim 8,
wherein the first area is located above the second area so as not to overlap the second area.

10. The vehicle display system according to claim 9,
wherein the second area includes a road surface within a first distance from a front end of the vehicle, while the first area includes a road surface exceeding the first distance from the front end of the vehicle.

11. The vehicle display system according to claim 8,
wherein the first area is located above the second area so as to partially overlap the second area.

12. The vehicle display system according to claim 11,
wherein the second area includes a road surface within a first distance from a front end of the vehicle, while the first area includes a road surface exceeding a second distance from the front end of the vehicle, and
wherein the second distance is smaller than the first distance.

13. The vehicle display system according to claim 8,
wherein the light pattern is emitted onto the road surface toward an object present around the vehicle, and
wherein the predetermined information indicates information on the object.

14. A vehicle display system provided in a vehicle, the vehicle display system comprising:
- a first display device configured to emit a light pattern toward a road surface outside the vehicle; and
- a second display device located inside the vehicle and configured to display predetermined information toward an occupant of the vehicle such that the predetermined information is superimposed on a real space outside the vehicle,
- wherein the first display device emits the light pattern toward an object, and the second display device displays information on the object toward the occupant,
- wherein the second display device is a head-up display, and
- wherein the head-up display is further configured to display a shielding pattern different from the predetermined information so as to overlap and hide the light pattern when viewed from the occupant.

15. The vehicle display system according to claim 14,
wherein when the object is present within a predetermined distance from the vehicle, the first display device emits the light pattern toward the object, and the second display device displays the information on the object toward the occupant.

16. The vehicle display system according to claim 14,
wherein the information on the object includes information indicating presence of the object.

17. The vehicle display system according to claim 14,
wherein the information on the object includes an enlarged image of the object.

18. The vehicle display system according to claim 14,
wherein the information on the object includes information on a future behavior of the object.

19. A vehicle system comprising:
the vehicle display system according to claim 14; and
a wireless communication unit configured to receive the information indicating the presence of the object from an external communication device present outside the vehicle.

20. A vehicle comprising:
the vehicle display system according to claim 1.

* * * * *